US012389390B2

(12) United States Patent
Zhang et al.

(10) Patent No.: US 12,389,390 B2
(45) Date of Patent: Aug. 12, 2025

(54) USER EQUIPMENT PROCESSING CAPABILITY INDICATION

(71) Applicant: QUALCOMM Incorporated, San Diego, CA (US)

(72) Inventors: Xiaoxia Zhang, San Diego, CA (US); Tao Luo, San Diego, CA (US); Jing Sun, San Diego, CA (US); Wooseok Nam, San Diego, CA (US); Qiang Wu, San Diego, CA (US); Srinivas Yerramalli, Hyderabad (IN); Zhifei Fan, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/163,196

(22) Filed: Jan. 29, 2021

(65) Prior Publication Data
US 2021/0360659 A1    Nov. 18, 2021

Related U.S. Application Data

(60) Provisional application No. 63/025,933, filed on May 15, 2020.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1819* (2013.01); *H04L 1/1835* (2013.01);
(Continued)

(58) Field of Classification Search
CPC .............. H04W 72/1268; H04W 8/24; H04W 72/0446; H04W 72/0453; H04W 72/1257;
(Continued)

(56) References Cited

U.S. PATENT DOCUMENTS

2018/0242319 A1* 8/2018 Akkarakaran ...... H04W 72/042
2018/0278374 A1* 9/2018 Zeng ..................... H04L 1/1896
(Continued)

FOREIGN PATENT DOCUMENTS

WO     2019051242 A2    3/2019

OTHER PUBLICATIONS

Medles et al. "HARQ Support for NTN Communication", U.S. Appl. No. 62/853,777, filed May 29, 2019 (Year: 2019).*
(Continued)

*Primary Examiner* — Thinh D Tran
(74) *Attorney, Agent, or Firm* — Procopio, Cory, Hargreaves & Savitch LLP

(57) ABSTRACT

A configuration to allow for scheduling communication with a UE having associated characteristics based on a timing indication. The apparatus receives, from a UE, a timing indication associated with a bandwidth, a subcarrier spacing, or a waveform. The timing indication identifying a delay duration based on a processing timeline for the UE. The apparatus receives from the UE, or transmits to the UE, a first data channel having the bandwidth, the subcarrier spacing, or the waveform scheduled based on the timing indication. The first data channel is transmitted or received at a first time based on the timing indication.

18 Claims, 16 Drawing Sheets

(51) Int. Cl.
*H04L 1/1829* (2023.01)
*H04L 27/26* (2006.01)
*H04W 8/24* (2009.01)
*H04W 72/0446* (2023.01)
*H04W 72/0453* (2023.01)
*H04W 72/50* (2023.01)

(52) U.S. Cl.
CPC ......... *H04L 27/26025* (2021.01); *H04W 8/24* (2013.01); *H04W 72/0446* (2013.01); *H04W 72/0453* (2013.01); *H04W 72/535* (2023.01)

(58) Field of Classification Search
CPC .... H04W 72/14; H04L 1/1819; H04L 1/1835; H04L 27/26025; H04L 5/0044; H04L 1/1822; H04L 1/1887; H04L 1/1896; H04L 5/0053
See application file for complete search history.

(56) References Cited

U.S. PATENT DOCUMENTS

| | | | | |
|---|---|---|---|---|
| 2018/0376498 | A1* | 12/2018 | Bhattad | H04L 1/1887 |
| 2019/0058554 | A1* | 2/2019 | Liao | H04L 1/1864 |
| 2019/0191429 | A1 | 6/2019 | Stern-Berkowitz et al. | |
| 2019/0208408 | A1* | 7/2019 | Frenne | H04W 24/08 |
| 2019/0246391 | A1 | 8/2019 | Zhang et al. | |
| 2019/0306872 | A1* | 10/2019 | Paredes Cabrera | H04W 72/23 |
| 2019/0320451 | A1* | 10/2019 | Hansen | H04W 72/51 |
| 2020/0221429 | A1* | 7/2020 | Li | H04W 72/042 |
| 2020/0382207 | A1* | 12/2020 | Medles | H04B 7/18532 |
| 2020/0389878 | A1* | 12/2020 | Karaki | H04L 1/1861 |
| 2020/0404604 | A1* | 12/2020 | Hande | H04W 52/0216 |
| 2021/0092751 | A1* | 3/2021 | Jiang | H04W 72/12 |
| 2021/0127416 | A1* | 4/2021 | Matsumura | H04W 24/08 |
| 2021/0243837 | A1* | 8/2021 | Jung | H04W 76/40 |
| 2021/0306967 | A1* | 9/2021 | Kang | H04J 11/0086 |
| 2021/0321369 | A1* | 10/2021 | Chen | H04W 76/27 |
| 2022/0046632 | A1* | 2/2022 | Zhao | H04W 72/0446 |
| 2022/0046723 | A1* | 2/2022 | Zhang | H04W 74/0866 |
| 2022/0132495 | A1* | 4/2022 | Bae | H04W 72/02 |
| 2023/0354275 | A1* | 11/2023 | Moon | H04W 74/0808 |

OTHER PUBLICATIONS

International Search Report and Written Opinion—PCT/US2021/032326—ISA/EPO—Sep. 10, 2021.
3GPP: "3rd Generation Partnership Project, Technical Specification Group Radio Access Network, NR, Radio Resource Control (RRC) Protocol Specification (Release 15)", 3GPP TS 38.331 V15.1.0, Mar. 2018, R2-1806985, TS 38.331 Baseline CR for the UE Capabilities, May 10, 2018, pp. 1-279.

\* cited by examiner

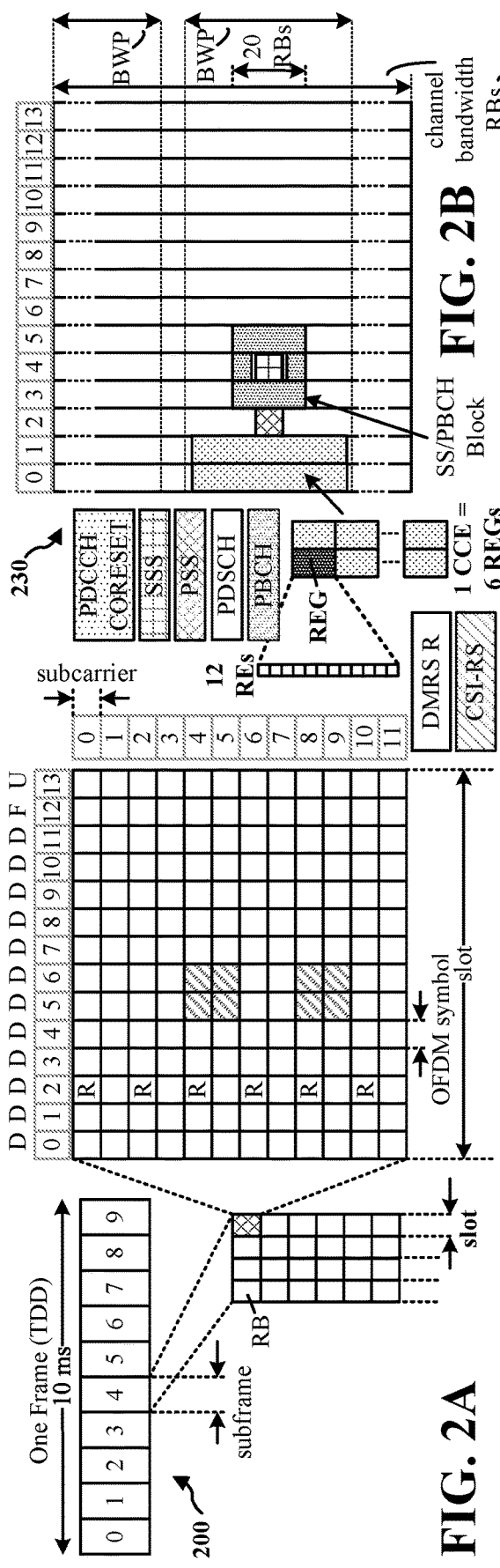
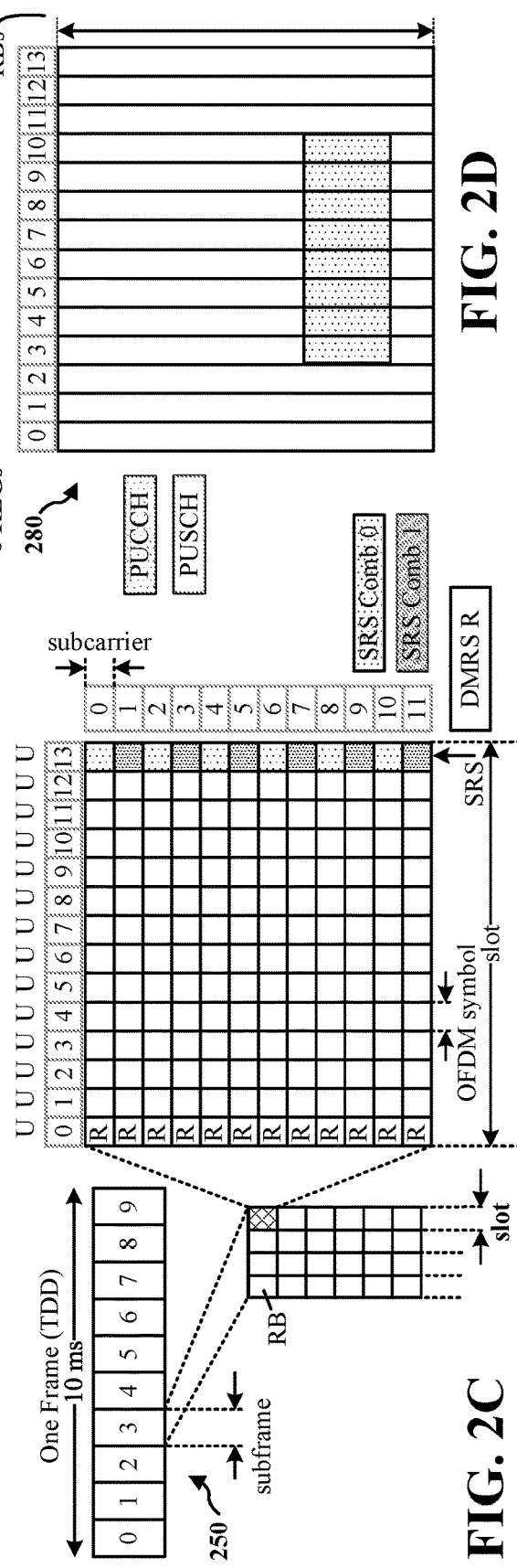
FIG. 2A  FIG. 2B  FIG. 2C  FIG. 2D

USER EQUIPMENT PROCESSING CAPABILITY INDICATION

CROSS REFERENCE TO RELATED APPLICATION(S)

This application claims the benefit of U.S. Provisional Application Ser. No. 63/025,933, entitled "User Equipment Processing Capability Indication" and filed on May 15, 2020, which is expressly incorporated by reference herein in its entirety.

BACKGROUND

Technical Field

The present disclosure relates generally to communication systems, and more particularly, to a configuration for a wireless communication system to perform scheduling based on a timing indication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus receives, from a user equipment (UE), a timing indication associated with a bandwidth, a subcarrier spacing, or a waveform. The timing indication identifying a delay duration based on a processing timeline for the UE. The apparatus receives from the UE, or transmits to the UE, a first data channel having the bandwidth, the subcarrier spacing, or the waveform scheduled based on the timing indication, wherein the first data channel is transmitted or received at a first time based on the timing indication.

In an aspect of the disclosure, a method, a computer-readable medium, and an apparatus are provided. The apparatus may be a device at a base station. The device may be a processor and/or a modem at a base station or the base station itself. The apparatus receives, from a user equipment (UE), a hybrid automatic repeat request (HARQ) capability indication associated with a bandwidth, a subcarrier spacing, or a waveform. The apparatus determines a number of HARQ processes for the UE. The apparatus transmits the determined number of HARQ processes to the UE associated with the bandwidth, the subcarrier spacing, or the waveform. The apparatus receives a combined HARQ from the UE if the determined number of HARQ processes is equal to or less than the HARQ capability indication. The apparatus receives an uncombined HARQ from the UE if the determined number of HARQ processes is greater than the HARQ capability indication.

In an aspect of the disclosure, a method, a computer-readable medium, and an apparatus are provided. The apparatus may be a device at a UE. The device may be a processor and/or a modem at a UE or the UE itself. The apparatus transmits, to a base station, a timing indication associated with a bandwidth, a subcarrier spacing, or a waveform. The timing indication identifying a delay duration based on a processing timeline for the UE. The apparatus receives from the base station, or transmits to the base station, a first data channel having the bandwidth, the subcarrier spacing, or the waveform scheduled based on the timing indication, wherein the first data channel is transmitted or received at a first time based on the timing indication.

In an aspect of the disclosure, a method, a computer-readable medium, and an apparatus are provided. The apparatus may be a device at a UE. The device may be a processor and/or a modem at a UE or the UE itself. The apparatus transmits, to a base station, a hybrid automatic repeat request (HARQ) capability indication associated with a bandwidth, a subcarrier spacing, or a waveform. The apparatus receives, from the base station, a number of HARQ processes associated with the bandwidth, the subcarrier spacing, or the waveform. The apparatus transmits a combined HARQ to the base station if the determined number of HARQ processes is equal to or less than the HARQ capability indication. The apparatus transmits an uncombined HARQ to the base station if the determined number of HARQ processes is greater than the HARQ capability indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
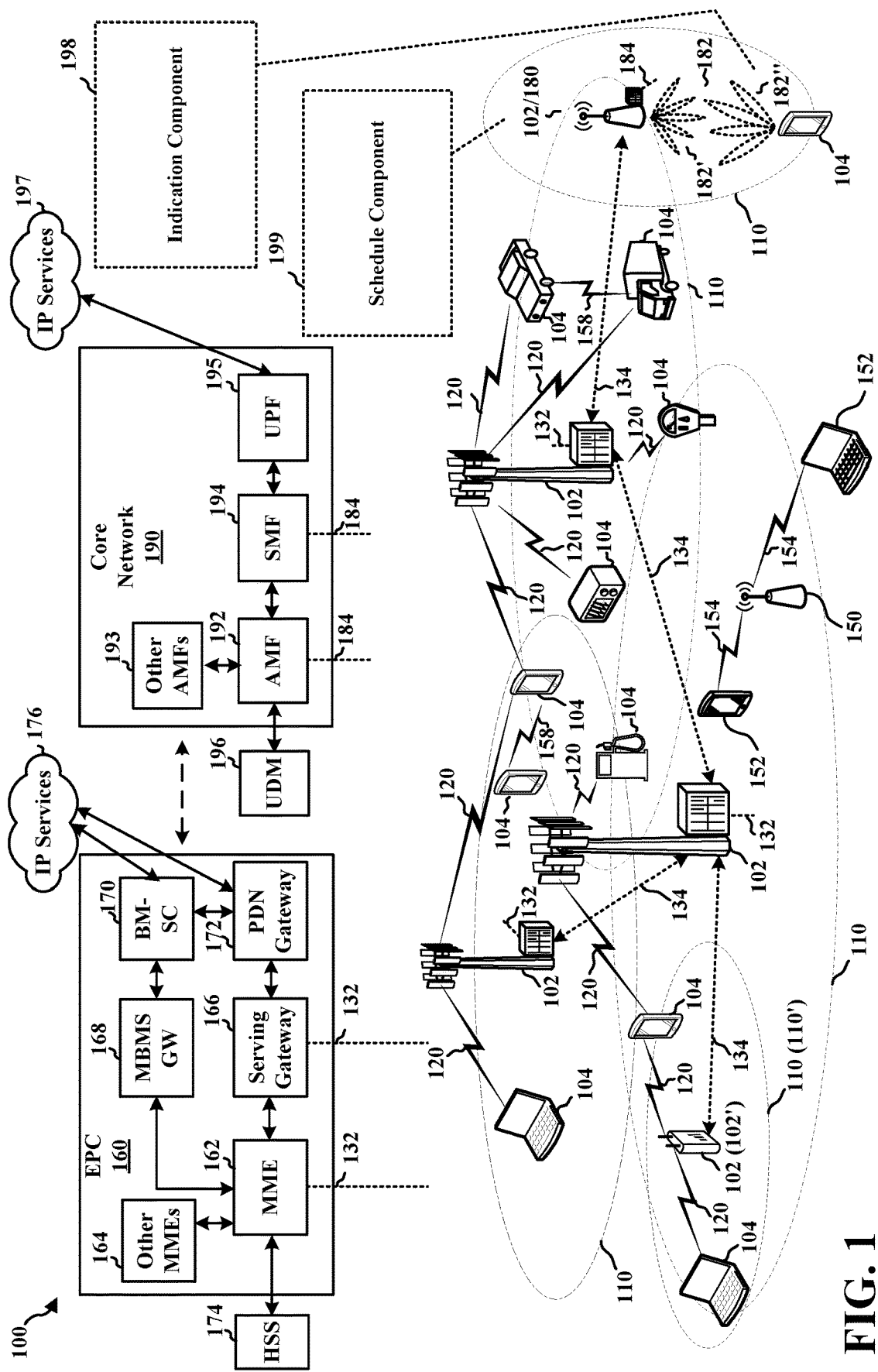
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit a timing indication including a UE capability associated with communications having certain characteristics (e.g., bandwidth, subcarrier spacing, waveform). For example, the UE 104 may include an indication component 198 configured to transmit the timing indication including the UE capability associated with communications having certain characteristics (e.g., bandwidth, subcarrier spacing, waveform). The UE 104 may transmit, to a base station 180, a timing indication associated with a bandwidth, a subcarrier spacing, or a waveform. The timing indication may identify a delay duration based on a processing timeline for the UE 104. The UE 104 may receive from the base station 180, or may transmit to the base station 180, a first data channel having the bandwidth, the subcarrier spacing, or the waveform scheduled based on the timing indication, wherein the first data channel is transmitted or received at a first time based on the timing indication.

Referring again to FIG. 1, in certain aspects, the base station 180 may be configured to receive a timing indication and schedule communications having associated characteristics based on the timing indication. For example, the base station 180 may include a schedule component 199 configured to schedule communications having associated characteristics based on the timing indication. The base station 180 may receive, from a UE 104, a timing indication associated with a bandwidth, a subcarrier spacing, or a waveform. The timing indication identifying a delay duration based on a processing timeline for the UE 104. The base station 180 may receive from the UE 104, or may transmit to the UE 104, a first data channel having the bandwidth, the subcarrier spacing, or the waveform scheduled based on the timing indication, wherein the first data channel is transmitted or received at a first time based on the timing indication.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
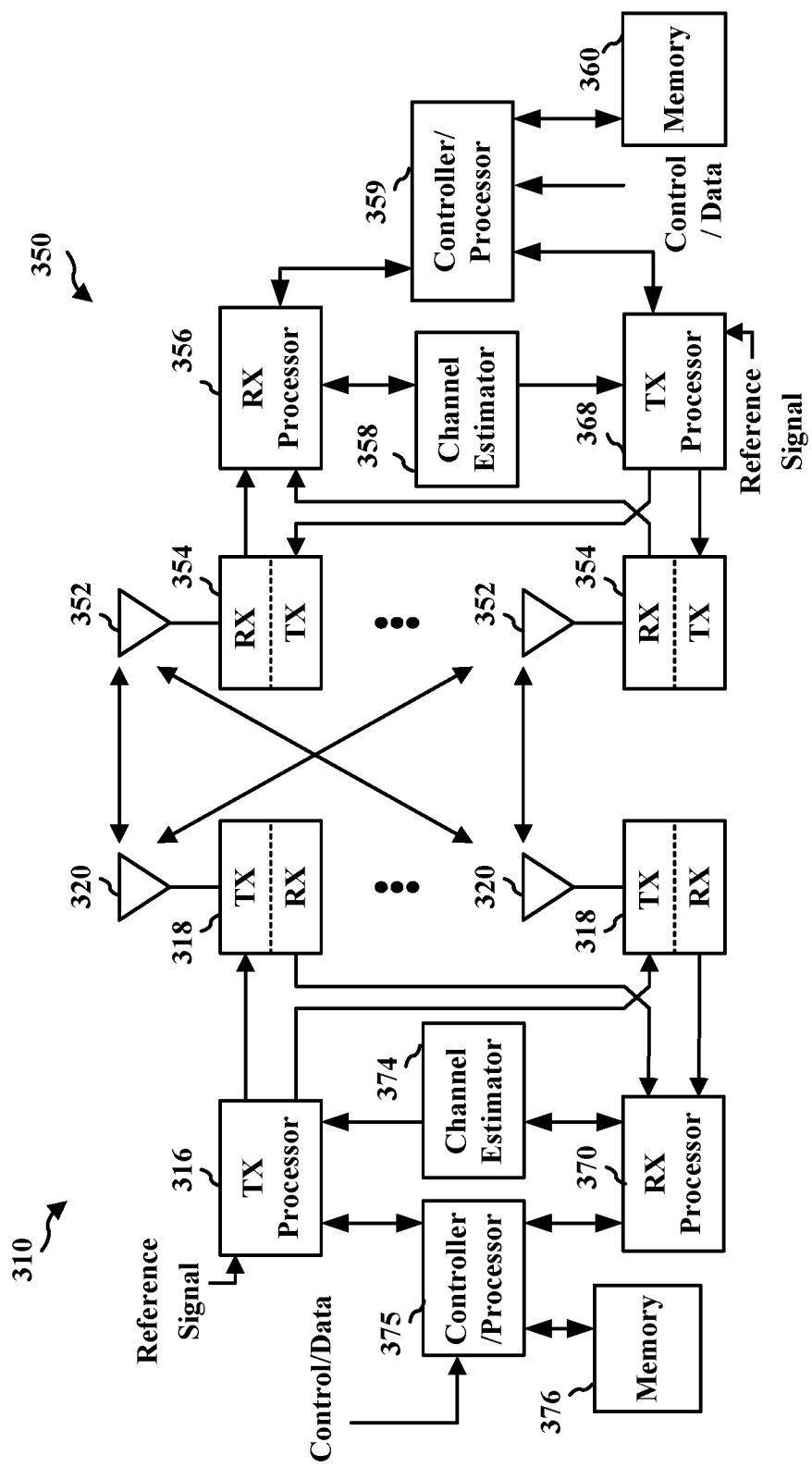
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
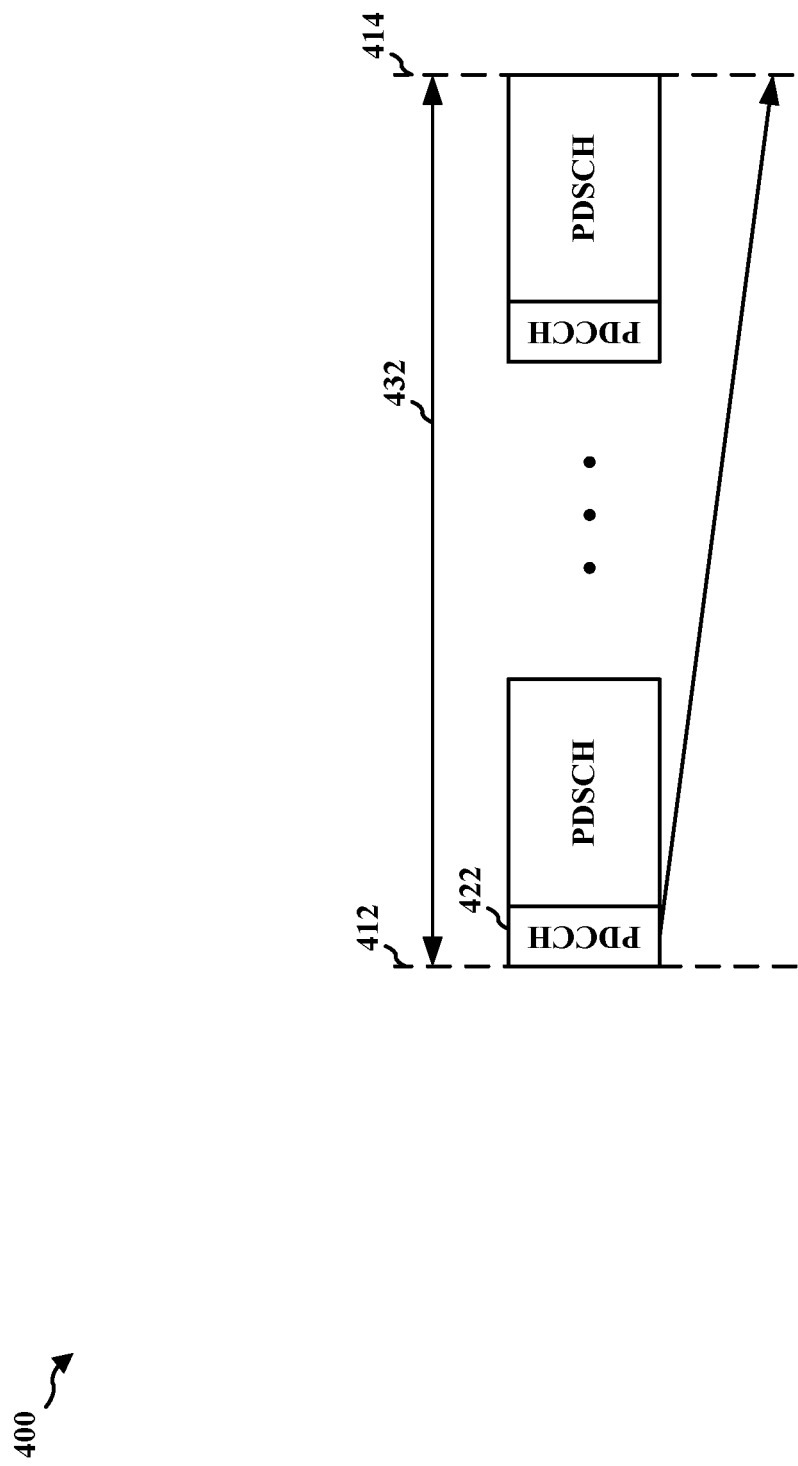
FIG. 4 is a diagram illustrating a UE processing time.

FIG. 4 is a diagram 400 illustrating a UE processing time. A UE may receive a PDCCH 422 from a base station at a first time 412. The UE may process the PDCCH 422 to determine one or more PDSCH received after the PDCCH 422 containing data for the UE. The UE may have a processing time 432, which is the time required to determine the content of the PDCCH 422 after receiving the PDCCH 422. The UE may finish processing the PDCCH 422 at a second time 414, which is the processing time 432 after the first time 412.

The UE may receive PDSCH instances during the processing time 432. As the UE has not finished processing the PDCCH 422 to determine whether PDSCH instances contain data for the UE, the UE may not know whether PDSCH instances received during the processing time 432 should be processed by the UE. Accordingly, the UE may store the PDSCH instances received during the processing time 432 on a buffer upon receiving the PDSCH instances. At the second time 414, upon completion of processing the PDCCH 422, if the UE determines that any of the PDSCH instances stored on the buffer contain data for the UE, the UE may retrieve the PDSCH instance from the buffer and process the PDSCH instance.

In some implementations, the UE may be able to store all received PDSCH instances in its buffer until determining whether each PDSCH instance contains data for the UE based on the PDCCH 422. Some implementations, such as those at higher frequency bands, may have higher subcarrier spacing and shorter symbol duration. As a result, the UE may receive more PDSCH instances in the same period of time. The UE may not have enough space on its buffer to store all PDSCH instances received during the processing time to determine which, if any, contain data for the UE.

Figure 5:
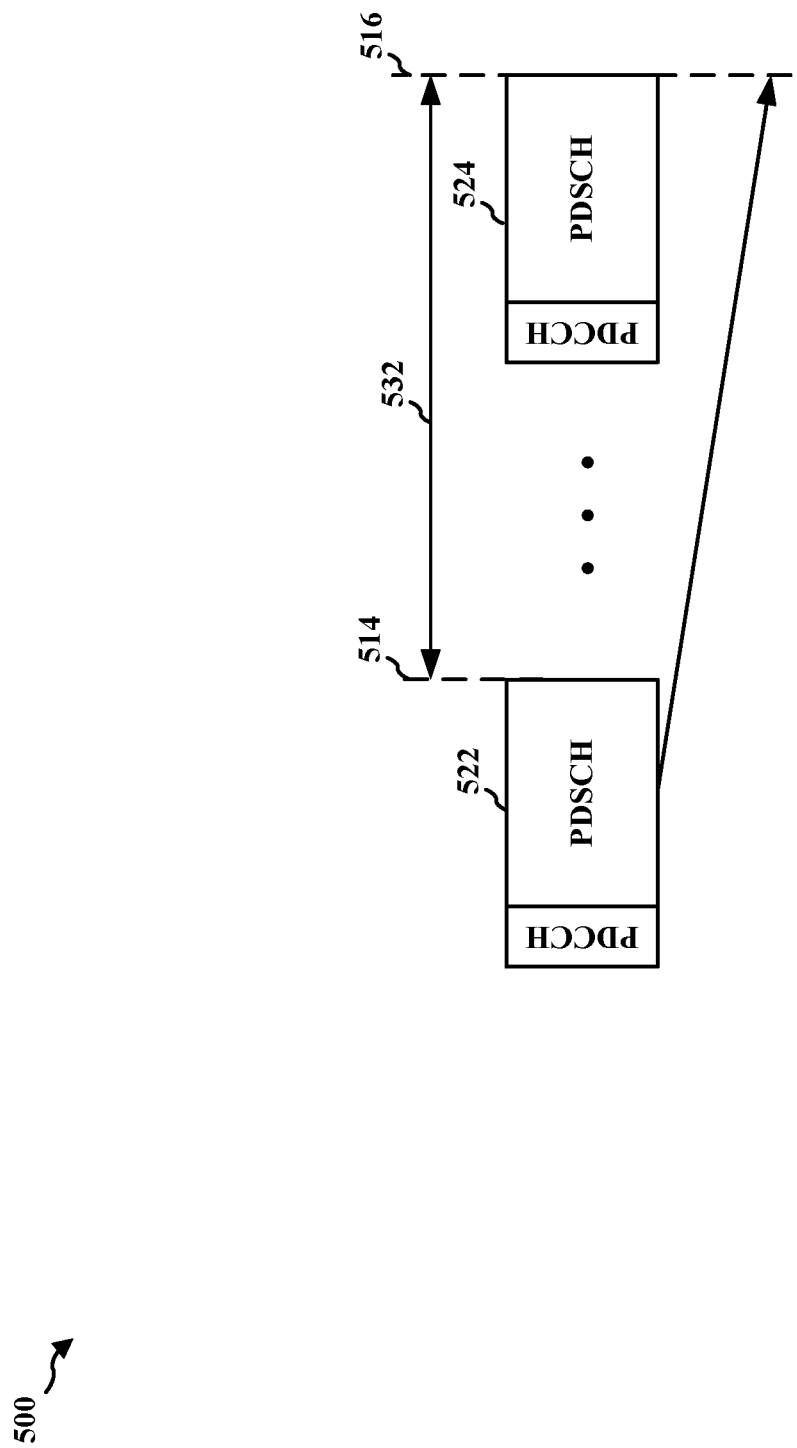
FIG. 5 is a diagram illustrating a UE processing time.

FIG. 5 is a diagram 500 illustrating a UE processing time. A UE may receive a PDSCH 522 containing data for the UE. The UE may begin processing the PDSCH 522 at a first time 514, and may complete processing the PDSCH 522 at a second time 516 after a processing time 532.

The UE may receive additional PDSCH instances during the processing time 532 which contain data for the UE and which the UE needs to process. For example, additional PDSCH 524 may include data for the UE, but may be received during the processing time 532, before the UE completes processing the PDSCH 522 at the second time 516. As the UE is processing the PDSCH 522, the UE may store the additional PDSCH 524 in a buffer of the UE to process after the second time 516.

In some implementations, the UE may be able to store all received PDSCH instances containing data for the UE until the UE is able to process the PDSCH instances. Some implementations, such as those at higher frequency bands, may have higher subcarrier spacing and shorter symbol duration. As a result, the UE may receive more PDSCH instances that need to be processed by the UE in the same period of time. These PDSCH instances may demand more of the UE's buffer resources, and the UE may receive PDSCH instances faster than the UE is able to process them.

Figure 6:
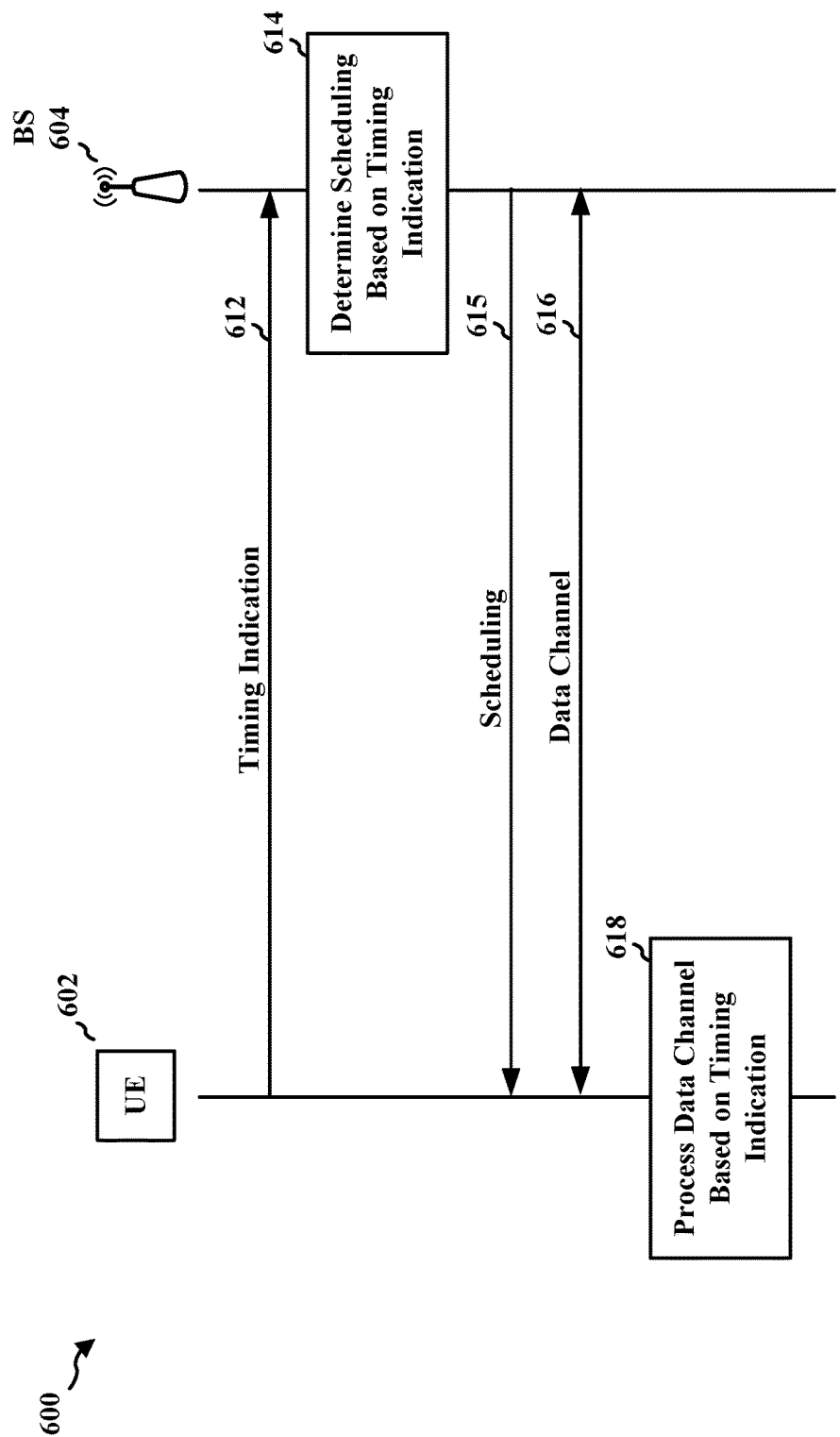
FIG. 6 is a call flow diagram of signaling between a UE and a base station in accordance with certain aspects of the disclosure.

FIG. 6 is a call flow diagram 600 of signaling between a UE 602 and a base station 604. The base station 504 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350. Optional aspects are illustrated with a dashed line.

As illustrated at 612, the UE 602 may transmit a timing indication 612 to the base station 604. The base station 604 may receive the timing indication 612 from the UE 602. The timing indication 612 may be associated with communications having a certain characteristic. In some aspects, the timing indication 612 may be associated with communications having a particular bandwidth, or a bandwidth falling within a given range. For example, the timing indication 612 may be associated with communications having a 100 MHz bandwidth or communications having a 2 GHz bandwidth. In some aspects, the timing indication 612 may be associated with communications having a certain subcarrier spacing, or a subcarrier spacing falling within a given range. For example, the timing indication 612 may be associated with communications having a 960 KHz subcarrier spacing, communications having a 1.92 MHz subcarrier spacing, or communications having a 3.84 MHz subcarrier spacing. In some aspects, the timing indication 612 may be associated with communications having a particular waveform. For example, the timing indication 612 may be associated with communications having an OFDM waveform, or communications having a SC-FDM waveform.

In some aspects, the timing indication 612 may be associated with communications having multiple characteristics. For example, the timing indication 612 may be associated with communications that have a particular bandwidth or a bandwidth falling within a given range; have a particular subcarrier spacing or a subcarrier spacing falling within a given range; and having a particular waveform. For example, the timing indication may be associated with communications having a 100 MHz bandwidth, with a 960 KHz subcarrier spacing, and an OFDM waveform.

The timing indication 612 may identify a capability of the UE 602 related to communications having the associated characteristic or characteristics. In some aspects, the timing indication 612 may indicate a minimum k0 for communications having the associated characteristic. In some aspects, the timing indication 612 may indicate a minimum k2 for communications having the associated characteristic. In some aspects, the timing indication 612 may indicate a minimum number of slots between scheduled data channels. In some aspects, the timing indication 612 may indicate a maximum number of hybrid automatic repeat request (HARQ) processes that the UE 602 can handle for HARQ combining for communications having the associated characteristics.

In some aspects, the timing indication 612 may identify different capabilities associated with different characteristics of communications. For example, the timing indication 612 may indicate that the UE 602 can support back-to-back scheduling of data channels (e.g., a minimum of zero slots between scheduled data channels) for communications having a 100 MHz bandwidth, 960 KHz subcarrier spacing, and an OFDM waveform; may indicate that the UE 602 can support a minimum of N slots between scheduled data channels for communications having a 2 GHz bandwidth, 960 KHz subcarrier spacing, and an OFDM waveform; and may indicate that the UE 602 can support a minimum of M slots between scheduled data channels for communications having a 2 GHz bandwidth, 960 KHz subcarrier spacing, and a single-carrier frequency division multiplex (SC-FDM) waveform.

As illustrated at 614, the base station 604 may determine scheduling for communications with the UE 602 based on the timing indication 612. The scheduling may be dynamic scheduling or periodic scheduling. The base station 604 may determine to schedule a channel for the UE 602, where the channel has the characteristics associated with the timing indication 612. The base station 604 may establish scheduling that is in accordance with the capability of the UE 602 indicated in the timing indication 612. For example, where the timing indication 612 indicates a minimum k0 for the UE 602, the base station 604 may establish scheduling such that a PDSCH containing data for the UE 602 (which has the characteristics associated with the timing indication 612) is scheduled a minimum period of time after the PDCCH containing the scheduling for the PDSCH.

The base station 604 may transmit scheduling information 615 to the UE 602 based on the determined scheduling. The UE 602 may receive the scheduling information 615. For example, the scheduling information 615 may be transmitted in a PDCCH, such as in DCI. The UE 602 and the base station 604 may transmit or receive a data channel 616 to one another in accordance with the scheduling information 615.

In some aspects, as illustrated at 618, the UE 602 may process a data channel based on the timing indication 612. For example, the data channel may be PDSCHs received from the base station 604. The UE 602 may receive a PDCCH from the base station scheduling a PDSCH for the UE 602, and the UE 602 may discard PDSCHs received for a period of time after the PDCCH based on the timing indication 612, and may buffer PDSCHs received after the period of time.

Figure 7:
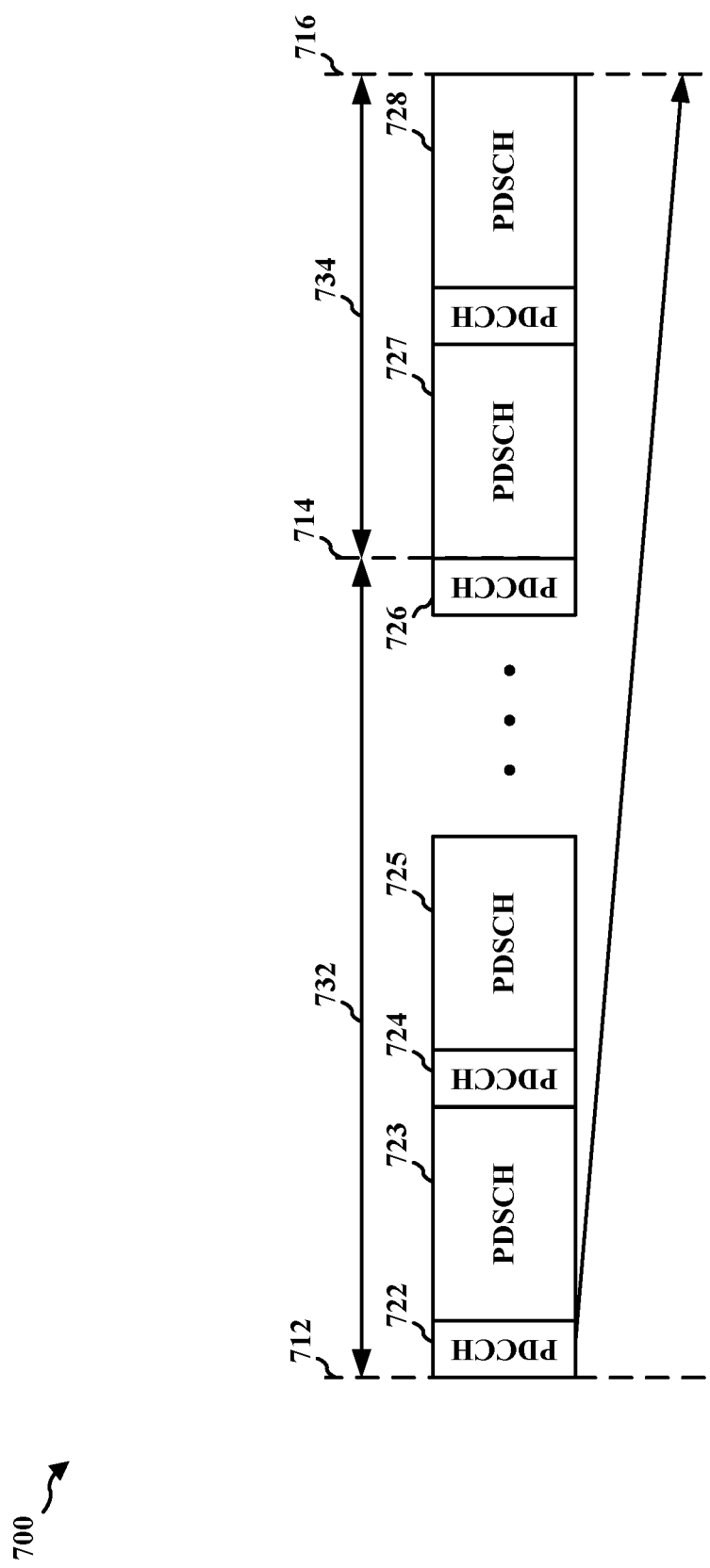
FIG. 7 is a diagram illustrating data channel scheduling based on a timing indication with respect to a control channel.

FIG. 7 is a diagram 700 illustrating data channel scheduling based on a timing indication with respect to a control channel. The timing indication may indicate a minimum period of time (e.g., a delay duration) between receiving a control channel containing scheduling for a data channel and transmitting or receiving the data channel (e.g., a minimum k0 or a minimum k2). The timing indication may indicate the minimum period of time (e.g., as a time value, a number of slots, number of symbols, as a number of subframes).

A UE may receive a PDCCH 722 from a base station at a first time 712. The PDCCH 722 may contain scheduling information scheduling the UE to receive a PDSCH. The PDCCH 722 and the scheduled PDSCH may have the characteristic(s) associated with the timing indication. The UE may process the PDCCH 722 to retrieve the scheduling data, and the UE may complete processing the PDCCH 722 at a second time 716. Until the UE has retrieved the scheduling data at the second time 716, the UE may not know it is scheduled to receive data on the scheduled PDSCH.

The UE may receive PDSCHs 723, 725, 727, and 728 between the first time 712 and the second time 716. The timing indication may identify a period of time 732. Based on the timing indication, the base station transmitting to the UE may have scheduled the PDSCH such that it is at least the period of time 732 after the PDCCH 722. The UE, based on the timing indication, may therefore determine that any PDSCH received from the base station between the first time 712 and a third time 714, which is the period of time 732 after the first time 712, is not scheduled to include data for the UE. Accordingly, the UE may discard any PDSCH received between the first time 712 and the third time 714 (e.g., PDSCH 723, PDSCH 725). The UE may store any PDSCH received after the third time 714 (e.g., during a period of time 734 between the third time 714 and the second time 716) on a buffer.

Upon processing the PDCCH 722 at the second time 716, the UE may determine the scheduled PDSCH. If the scheduled PDSCH has already been received by the UE, the UE may retrieve the scheduled PDSCH from the buffer. For example, the scheduled PDSCH may be PDSCH 727 or PDSCH 728. The UE may retrieve the scheduled PDSCH from the buffer and may process the PDSCH to retrieve the data.

In some aspects, the UE may discard (e.g., may not store to the buffer) communications received from the base station between the first time 712 and the third time 714. For example, the UE may discard PDCCH 724 and PDCCH 726 along with PDSCH 723 and PDSCH 725.

In some aspects, the UE may discard PDSCHs received from the base station between the first time 712 and the third time 714, but may store other communications received to the buffer of the UE. For example, the UE may store PDCCHs (e.g., PDCCH 724 and PDSCH 726) and periodic signals (e.g., periodic CSI-RS) received between the first time 712 and the third time 714 to the buffer, but may discard PDSCH 723 and PDSCH 725.

Although the above example is with respect to PDSCH, in some aspects, the UE may perform a similar process with PUSCH. For example, the UE may receive a PDCCH scheduling the UE to transmit a PUSCH. The UE may process the PDCCH to retrieve the scheduling data. Based on the timing indication, the base station transmitting the PDCCH to the UE may have scheduled the PUSCH such that it is at least the period of time indicated by the timing indication after the PDCCH scheduling the PUSCH. Upon processing the PDCCH, to retrieve the scheduling data, the UE may determine to transmit the PUSCH as the scheduled time.

Figure 8:
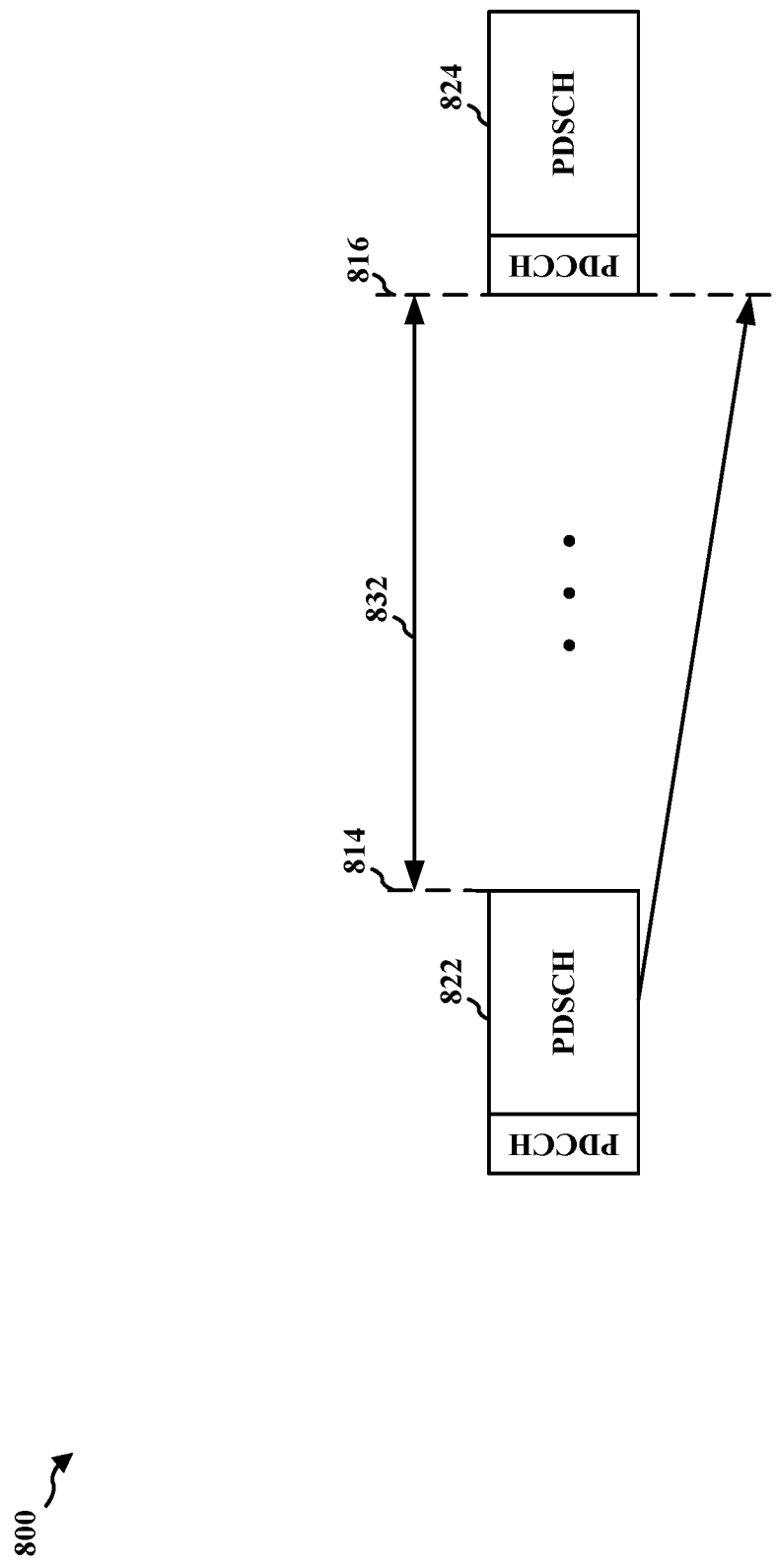
FIG. 8 is a diagram illustrating data channel scheduling based on a timing indication with respect to another data channel.

FIG. 8 is a diagram 800 illustrating data channel scheduling based on a timing indication with respect to another data channel. The timing indication may indicate a minimum period of time (e.g., a delay duration) between transmitting or receiving a first data channel and transmitting or receiving a second data channel. The timing indication may indicate the minimum period of time as a time value, or as a number of slots.

A UE may be scheduled to receive a first PDSCH 822 and a second PDSCH 824 containing data for the UE from a base station. The first PDSCH 822 and the second PDSCH 824 may have the characteristic(s) associated with the timing indication. The UE may receive the first PDSCH 822 from the base station. The UE may finish receiving the first PDSCH 822 at a first time 814. Upon receiving the first PDSCH 822, the UE may process the first PDSCH 822 to retrieve the data. The UE may complete processing of the first PDSCH 822 at a second time 816.

The timing indication may identify a period of time 832. Based on the timing indication, the base station may schedule the second PDSCH 824 to be received by the UE at least the period of time 832 after the first PDSCH 822 is received.

In some aspects, the period of time 832 is at least the amount of time the UE takes to process the first PDSCH 822, so the UE is done processing the first PDSCH 822 when it received the second PDSCH 824 and will not have to wait to begin processing the second PDSCH 824. In some aspects, the period of time may be less that the amount of time the UE takes to process the first PDSCH 822. The UE may need to wait until the first PDSCH 822 is finished processing before processing the second PDSCH 824, but the possibility of PDSCH processing backing up may be reduced.

Upon receiving the second PDSCH 824 (and, in some aspects, upon completion of processing of the first PDSCH 822), the UE may process the second PDSCH 824 to retrieve the data for the UE.

Although the above example is with respect to PDSCH, in some aspects, the UE may perform a similar process with PUSCH. The UE may be scheduled to transmit a first PUSCH and a second PUSCH. The second PUSCH may be at least a period of time indicated by the timing indication after the first PUSCH. The period of time may be based on the amount of time the UE takes to generate the first PUSCH for transmission. The UE may generate and transmit the first PUSCH, and then may generate and transmit the second PUSCH at the scheduled times.

Figure 9:
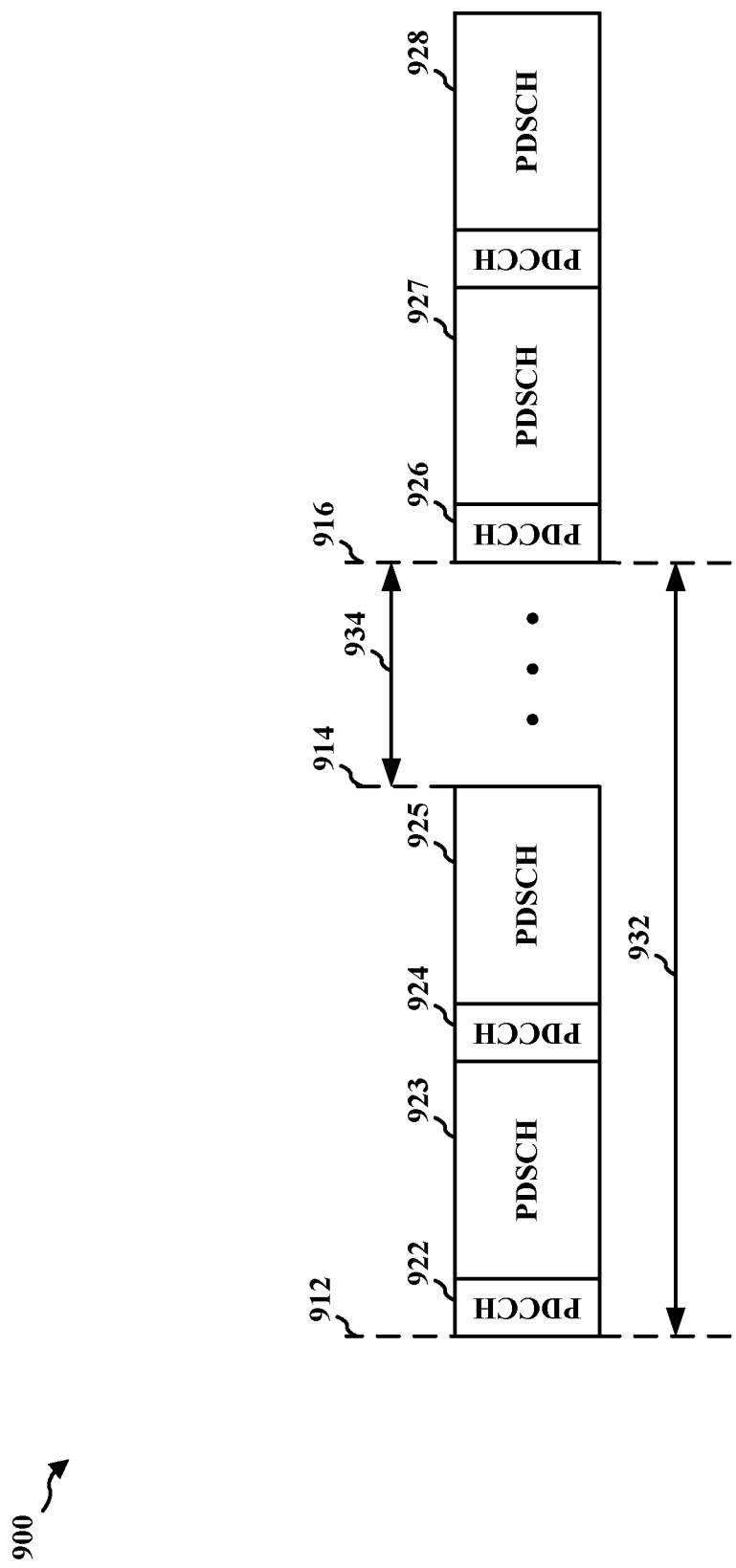
FIG. 9 is a diagram illustrating periodic scheduling based on a timing indication.

FIG. 9 is a diagram 900 illustrating periodic scheduling based on a timing indication. A base station may configure a periodic scheduling pattern for a UE based on the timing indication. The base station may define a period of N slots, and may indicate active slots within the period during which the UE may be scheduled to receive a PDSCH or transmit a PUSCH. For example, the base station may determine that every 10 slots, the UE may be scheduled to receive PDSCH in the first slot and the second slot.

In some aspects, the base station may configure a first periodic scheduling pattern for the UE for downlink communications, and may configure a second periodic scheduling pattern for the UE for uplink communications. Both the first periodic scheduling pattern and the second periodic scheduling pattern may be based on the timing indication. The first periodic scheduling pattern and the second periodic scheduling pattern may have different periods (e.g., different numbers of slots) and may have different active slots patterns within their respective periods.

As illustrated in FIG. 9, the base station may generate a periodic scheduling pattern for the UE having a period 932. The scheduling pattern may indicate that the UE may be scheduled to receive a PDSCH in the first slot of each period. Accordingly, the UE may monitor a PDSCH 923 in the period 932 (e.g., may store the PDSCH 923 on a buffer). The UE may also monitor a PDSCH 927 in the following period. The UE may not monitor the remaining PDSCHs in the period 932 (e.g., may discard the remaining PDSCHs).

In some aspects, the periodic scheduling pattern may account for the timing indication based on particular slots, such as in the examples discussed above with respect to FIGS. 7 and 8. For example, the timing indication may indicate that the UE can support a minimum of three slots between receiving PDSCHs. Based on the timing indication, in a period of 10 slots, the base station may configure the UE to be able to be scheduled to receive PDSCHs in the first slot and the fifth slot, but the base station may not configure the UE to be able to be scheduled to receive PDSCHs in the first slot and the second slot. For example, as illustrated in FIG. 9, the base station may configure the UE to receive data in the PDSCH 923 and the PDSCH 927 in the first slots of their respective periods, but not in the PDSCH 925 or the PDSCH 928 in the second slots of their respective periods.

In some aspects, the periodic scheduling pattern may account for the timing indication over the duration of the period. For example, the timing indication may indicate that the UE may support a minimum of three slots between receiving PDSCHs. The periodic scheduling pattern may configure the UE to have at least three slots processing time per PDSCH received per period, but may not necessarily provide those slots between the PDSCHs received within the period. For example, as illustrated in FIG. 9, the period 932 may be 10 slots and the timing indication may indicate that the UE may support a minimum of three slots between receiving PDSCHs. The base station may configure the UE to be able to be scheduled to receive data in the PDSCH 923 and the PDSCH 925 during the period 932 (e.g., the first slot and the second slot may be active). Accordingly, the UE may be scheduled to receive PDSCHs in adjacent slots. However, the periodic scheduling pattern provides a gap 934 between the end of the second slot and the beginning of the next period. Accordingly, the UE is provided with greater than three slots of processing time per scheduled PDSCH during the period 932. The UE may receive the PDSCH 923 and the PDSCH 925 during the first period, and may buffer them for processing. The UE may then receive the PDSCH 927 and the PDSCH 928 in the next period, and buffer them for processing.

During the gap 934, where the periodic scheduling pattern has not scheduled the UE, the UE may not receive PDSCH, or may discard received PDSCH. In some aspects, the UE may not include ACK/NACK for the slots which are not active for the ACK/NACK feedback (e.g., Type 1 ACK/NACK codebook).

Figure 10:
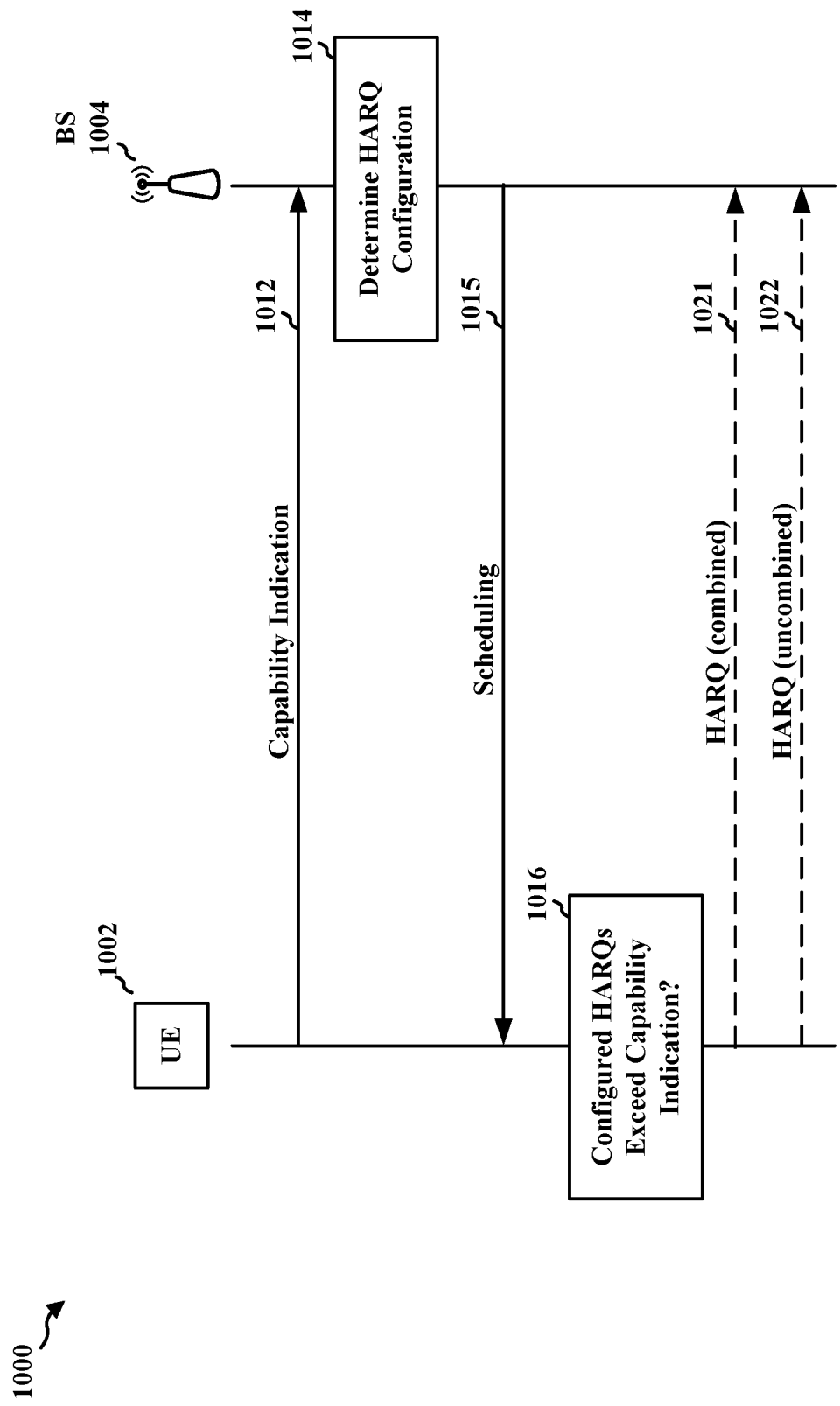
FIG. 10 is a call flow diagram of signaling between a UE and a base station in accordance with certain aspects of the disclosure.

FIG. 10 is a call flow diagram 1000 of signaling between a UE 1002 and a base station 1004. The base station 1004 may be configured to provide at least one cell. The UE 1002 may be configured to communicate with the base station 1004. For example, in the context of FIG. 1, the base station 1004 may correspond to base station 102/180 and, accordingly, the cell may include a geographic coverage area 110 in which communication coverage is provided and/or small cell 102' having a coverage area 110'. Further, a UE 1002 may correspond to at least UE 104. In another example, in the context of FIG. 3, the base station 1004 may correspond to base station 310 and the UE 1002 may correspond to UE 350. Optional aspects are illustrated with a dashed line.

As illustrated at 1012, the UE 1002 may transmit a capability indication 1012 to a base station 1004. The base station 1004 may receive the capability indication 1012 from the UE 1002. The capability indication 1012 may be associated with communications having a certain characteristic or characteristics (e.g., bandwidth, subcarrier spacing, and/or waveform). The capability indication 1012 may indicate a maximum number of HARQ processes that the UE 1002 can handle for HARQ combining for communications having the associated characteristics. In some aspects, the maximum number of HARQ processes indicated in the capability indication 1012 may be based on a size of a HARQ buffer of the UE 1002.

As illustrated at 1014, the base station 1004 may determine a HARQ configuration for the UE 1002. The base station 1004 may or may not exceed the number of HARQ processes identified in the capability indication 1012. If the base station 1004 configures the UE for a number of HARQ processes equal to or less than the number indicated in the capability indication 1012, the base station 1004 may know that the UE 1002 will utilize HARQ combining for the HARQ processes. If the base station 1004 configures the UE for a number of HARQ process exceeding the number indicated in the capability indication 1012, the base station 1004 may not know whether the UE 1002 will utilize HARQ combining.

The base station 1004 may configure and transmit scheduling information 1015 to the UE 1002 based on the HARQ configuration determined at 1014. For example, when the base station 1004 configures a number of HARQ processes exceeding what UE 1002 can support for HARQ combining, base station 1004 may attempt to schedule the UE 1002 with a more conservative data rate such that the chances for UE 1002 to decode the data without combining is higher. Additionally or alternatively, the base station 1004 may try to use a redundancy version which is easier to be self-decodable when it performs transmission and retransmission as the UE 1002 may not be able to perform HARQ combining. When base station 1004 configures a number of HARQ processes which allows UE 1002 to perform HARQ combining, base station may target a more aggressive data rate for initial transmission and may also use a different redundancy version for retransmission to benefit from the incremental redundancy (IR) gain.

As illustrated at 1016, the UE 1002 determines based on the scheduling information 1015 whether the number of HARQ processes configured exceeds the number of HARQ processes indicated in the capability indication 1012. In some aspects, if the number of configured HARQ processes is equal to or less than the number indicated in the capability indication 1012, the UE 1002 may support HARQ combining and may transmit combined HARQ 1021 to the base station. In some aspects, if the number of configured HARQ processes exceeds the number indicated in the capability indication 1012, the UE may or may not support HARQ combining, and may either transmit combined HARQ 1021 to the base station 1004 or uncombined HARQ 1022 to the base station 1004. For example, the UE may transmit an uncombined HARQ if the number of HARQ processes is greater than the HARQ capability indication.

Figure 11:
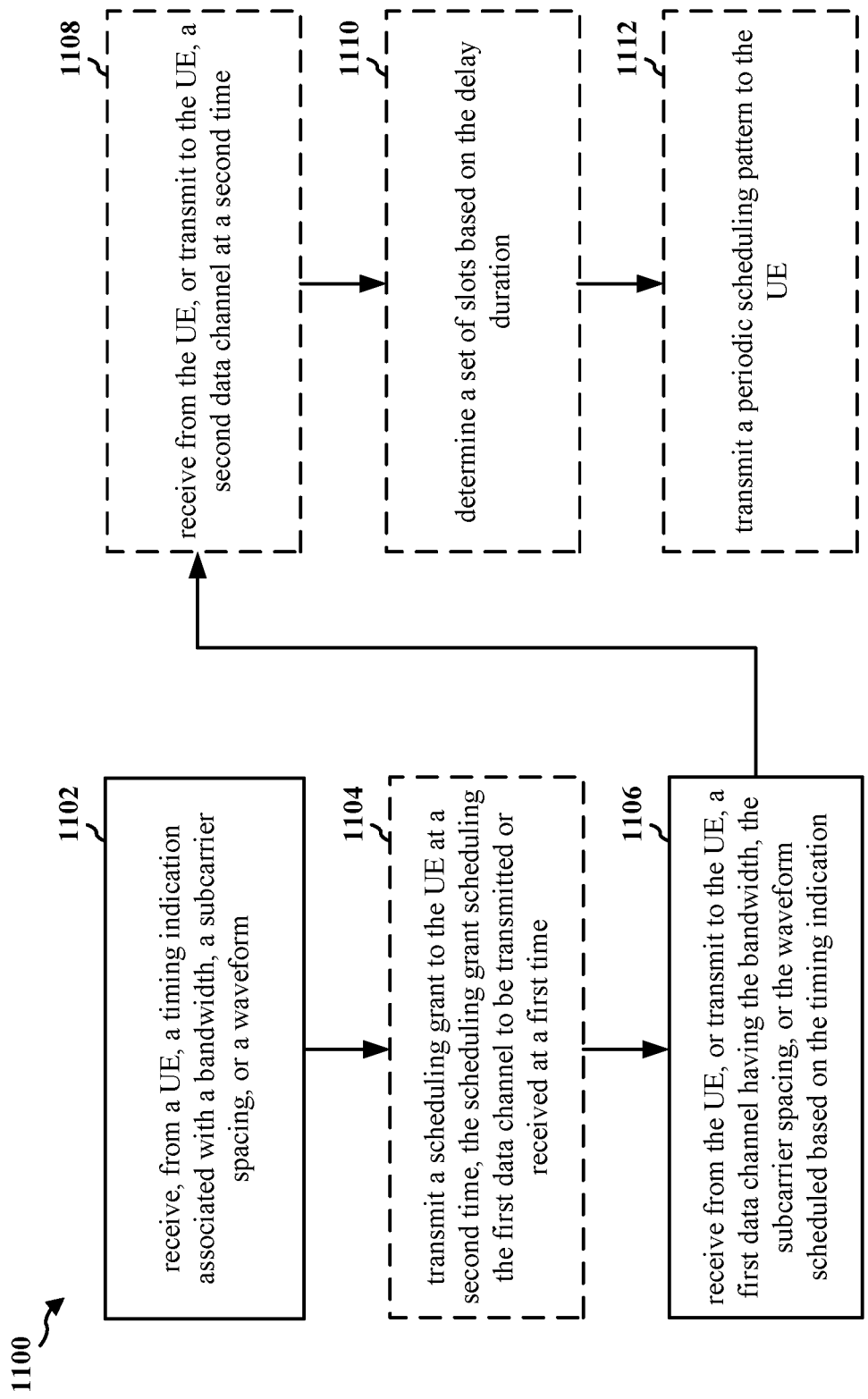
FIG. 11 is a flowchart of a method of wireless communication.

FIG. 11 is a flowchart 1100 of a method of wireless communication. The method may be performed by a base station or a component of a base station (e.g., the base station 102/180; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to schedule communication with at least one UE having associated characteristics based on a timing indication.

At 1102, the base station may receive a timing indication associated with a bandwidth, a subcarrier spacing, or a waveform. For example, 1102 may be performed by indication component 1340 of apparatus 1302. The base station may receive the timing indication from a UE. The timing indication may identify a delay duration. The delay duration may be based on a processing timeline for the UE. In some aspects, the delay duration may be a number of slots. In some aspects, the delay duration may be based on a processing speed of the UE or a buffer size of the UE.

In some aspects, for example at 1104, the base station may transmit a scheduling grant to the UE. For example, 1104 may be performed by schedule component 1342 of apparatus 1302. The base station may transmit the scheduling grant to the UE at a second time. The scheduling grant may schedule a first data channel to be transmitted or received at a first time. A time duration may separate the first time and the second time that may be equal to or greater than the delay duration.

At 1106, the base station may receive from the UE or transmit to the UE the first data channel having the bandwidth, the subcarrier spacing, or the waveform scheduled based on the timing indication. For example, 1106 may be performed by channel component 1344 of apparatus 1302. The first data channel may be transmitted or may be received at the first time based on the timing indication.

In some aspects, for example at 1108, the base station may receive from the UE or transmit to the UE a second data channel at the second time. For example, 1108 may be performed by channel component 1344 of apparatus 1302. A time duration may separate the first time and the second time that may be equal to or greater than the delay duration.

In some aspects, for example at 1110, the base station may determine a set of slots. For example, 1110 may be performed by determination component 1348 of apparatus 1302. The base station may determine the set of slots based on the delay duration.

In some aspects, for example at 1112, the base station may transmit a periodic scheduling pattern. For example, 1112 may be performed by schedule component 1342 of apparatus 1302. The base station may transmit the periodic scheduling pattern to the UE. The periodic scheduling pattern may indicate the set of slots for the UE to transmit or receive data channels comprising the first data channel.

Figure 12:
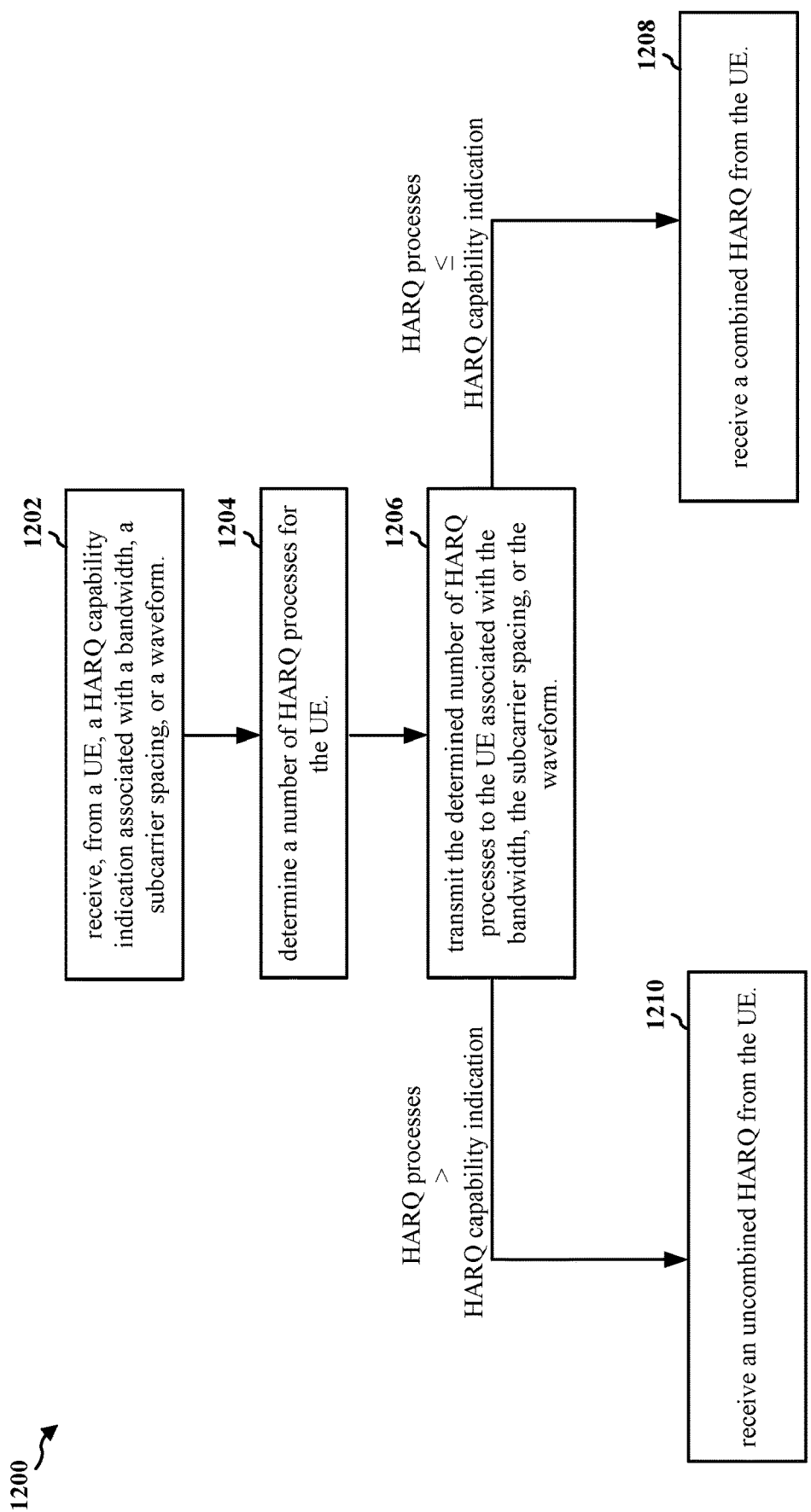
FIG. 12 is a flowchart of a method of wireless communication.

FIG. 12 is a flowchart 1200 of a method of wireless communication. The method may be performed by a base station or a component of a base station (e.g., the base station 102/180; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to schedule communication with at least one UE having associated characteristics based on a HARQ capability indication.

At 1202, the base station may receive a HARQ capability indication associated with a bandwidth, a subcarrier spacing, or a waveform. For example, 1202 may be performed by HARQ capability component 1346 of apparatus 1302. The base station may receive the HARQ capability indication from a UE. In some aspects, the HARQ capability indication may be based on a size of a HARQ buffer of the UE.

At 1204, the base station may determine a number of HARQ processes. For example, 1204 may be performed by determination component 1348 of apparatus 1302. The base station may determine the number of HARQ processes for the UE associated with the bandwidth, the subcarrier spacing, or the waveform.

At 1206, the base station may transmit the determined number of HARQ processes. For example, 1206 may be performed by HARQ process component 1350 of apparatus 1302. The base station may transmit the determined number of HARQ processes to the UE associated with the bandwidth, the subcarrier spacing, or the waveform.

At 1208, the base station may receive a combined HARQ from the UE. For example, 1208 may be performed by combined HARQ component 1352 of apparatus 1302. The base station may receive the combined HARQ from the UE if the determined number of HARQ processes is equal to or less than the HARQ capability indication.

At 1210, the base station may receive an uncombined HARQ from the UE. For example, 1210 may be performed by uncombined HARQ component 1354 of apparatus 1302. The base station may receive the uncombined HARQ from the UE if the determined number of HARQ processes is greater than the HARQ capability indication.

Figure 13:
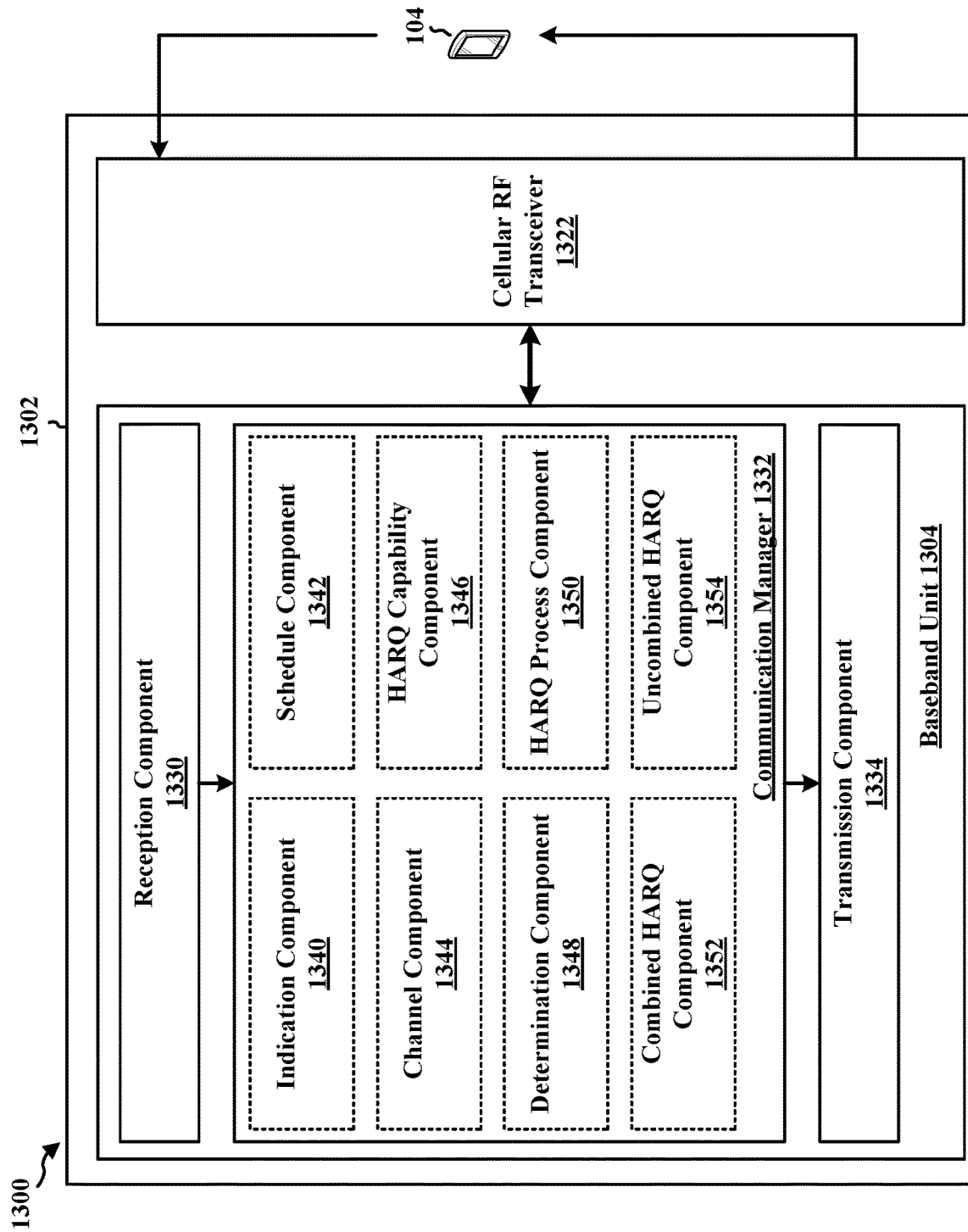
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes an indication component 1340 that may receive a timing indication associated with a bandwidth, a subcarrier spacing, or a waveform, e.g., as described in connection with 1102 of FIG. 11. The communication manager 1332 further includes a schedule component 1342 that may transmit a scheduling grant to the UE, e.g., as described in connection with 1104 of FIG. 11. The schedule component 1342 may be configured to transmit a periodic scheduling pattern, e.g., as described in connection with 1110 of FIG. 11. The communication manager 1332 further includes a channel component 1344 that may receive from the UE or transmit to the UE the first data channel having the bandwidth, the subcarrier spacing, or the waveform scheduled based on the timing indication, e.g., as described in connection with 1106 of FIG. 11. The channel component 1344 may be configured to receive from the UE or transmit to the UE a second data channel at the second time, e.g., as described in connection with 1108 of FIG. 11. The communication manager 1332 further includes a HARQ capability component 1346 that may receive a HARQ capability indication associated with a bandwidth, a subcarrier spacing, or a waveform, e.g., as described in connection with 1202 of FIG. 12. The communication manager 1332 further includes a determination component 1348 that may determine a number of HARQ processes, e.g., as described in connection with 1204 of FIG. 12. The determination component 1348 may be configured to determine a set of slots, e.g., as described in connection with 1110 of FIG. 11. The communication manager 1332 further includes a HARQ process component 1350 that may transmit the determined number of HARQ processes, e.g., as described in connection with 1206 of FIG. 12. The communication manager 1332 further includes a combined HARQ component 1352 that may receive a combined HARQ from the UE, e.g., as described in connection with 1208 of FIG. 12. The communication manager 1332 further includes an uncombined HARQ component 1354 that may receive an uncombined HARQ from the UE, e.g., as described in connection with 1210 of FIG. 12.

The apparatus may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for receiving, from a user equipment (UE), a timing indication associated with a bandwidth, a subcarrier spacing, or a waveform, the timing indication identifying a delay duration based on a processing timeline for the UE. The apparatus includes means for receiving from the UE, or transmitting to the UE, a first data channel having the bandwidth, the subcarrier spacing, or the waveform scheduled based on the timing indication. The first data channel is transmitted or received at a first time based on the timing indication. The apparatus further includes means for transmitting a scheduling grant to the UE at a second time, the scheduling grant scheduling the first data channel to be transmitted or received at the first time. A time duration separating the first time and the second time that is equal to or greater than the delay duration. The apparatus further includes means for receiving from the UE, or transmitting to the UE, a second data channel at a second time. A time duration separating the first time and the second time that is equal to or greater than the delay duration. The apparatus further includes means for determining a set of slots based on the delay duration. The apparatus further includes means for transmitting a periodic scheduling pattern to the UE, the periodic scheduling pattern indicating the set of slots for the UE to transmit or receive data channels comprising the first data channel. The apparatus includes means for receiving, from a UE, a HARQ capability indication associated with a bandwidth, a subcarrier spacing, or a waveform. The apparatus includes means for determining a number of HARQ processes for the UE. The apparatus includes means for transmitting the determined number of HARQ processes to the UE associated with the bandwidth, the subcarrier spacing, or the waveform. The apparatus includes means for receiving a combined HARQ from the UE if the determined number of HARQ processes is equal to or less than the HARQ capability indication. The apparatus includes means for receiving an uncombined HARQ from the UE if the determined number of HARQ processes is greater than the HARQ capability indication. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
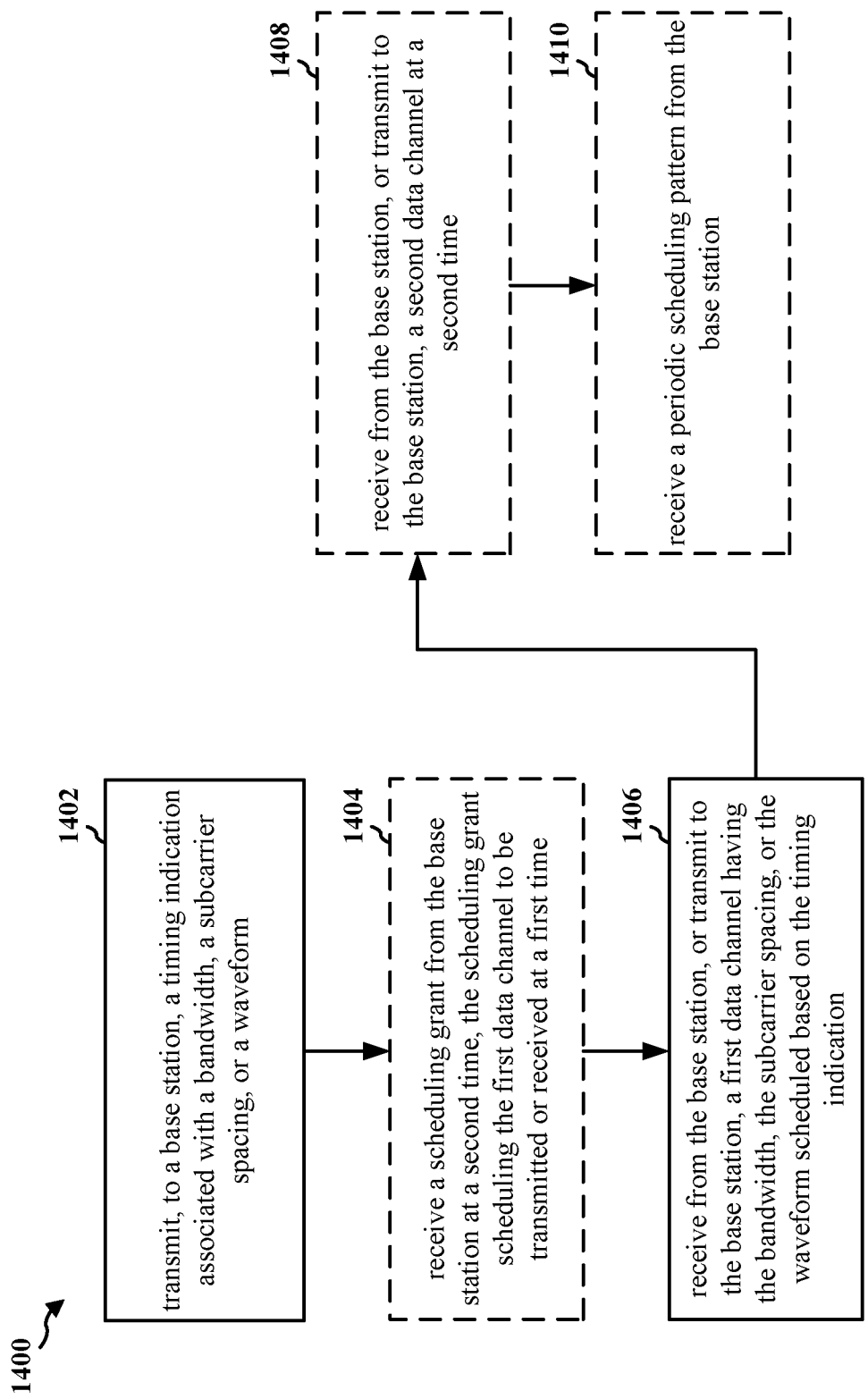
FIG. 14 is a flowchart of a method of wireless communication.

FIG. 14 is a flowchart 1400 of a method of wireless communication. The method may be performed by a UE or a component of a UE (e.g., the UE 104; the apparatus 1602; the cellular baseband processor 1604, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may configure the UE to receive scheduled communications with a base station having associated characteristics based on a timing indication.

At 1402, the UE may transmit a timing indication associated with a bandwidth, a subcarrier spacing, or a waveform. For example, 1402 may be performed by indication component 1640 of apparatus 1602. The UE may transmit the timing indication to a base station. The timing indication may identify a delay duration based on a processing timeline for the UE. In some aspects, the delay duration may be a number of slots. In some aspects, the delay duration may be based on a processing speed of the UE or a buffer size of the UE.

In some aspects, for example at 1404, the UE may receive a scheduling grant. For example, 1404 may be performed by schedule component 1642 of apparatus 1602. The UE may receive the scheduling grant from the base station. The UE may receive the scheduling grant at a second time. The scheduling grant may schedule a first data channel to be transmitted or received at a first time. A time duration may separate the first time and the second time that may be equal to or greater than the delay duration. In some aspects, the UE may receive a set of data channels from the base station. In some aspects, the UE may discard one or more data channels of the set of data channels received during the time duration. In some aspects, the UE may store one or more data channels of the set of data channels received after the time duration on a buffer of the UE.

At 1406, the UE may receive from the base station or transmit to the base station a first data channel. For example, 1406 may be performed by channel component 1644 of apparatus 1602. The first data channel may have the bandwidth, the subcarrier spacing, or the waveform scheduled based on the timing indication. The first data channel may be transmitted or received at the first time based on the timing indication.

In some aspects, for example at 1408, the UE may receive from the base station or transmit to the base station a second data channel at a second time. For example, 1408 may be performed by channel component 1644 of apparatus 1602. The first time may be at least the delay duration after the second time.

In some aspects, for example at 1410, the UE may receive a periodic scheduling pattern from the base station. For example, 1410 may be performed by schedule component 1642 of apparatus 1602. The periodic scheduling pattern may identify a set of slots for the UE to transmit or receive data channels comprising the first data channel.

Figure 15:
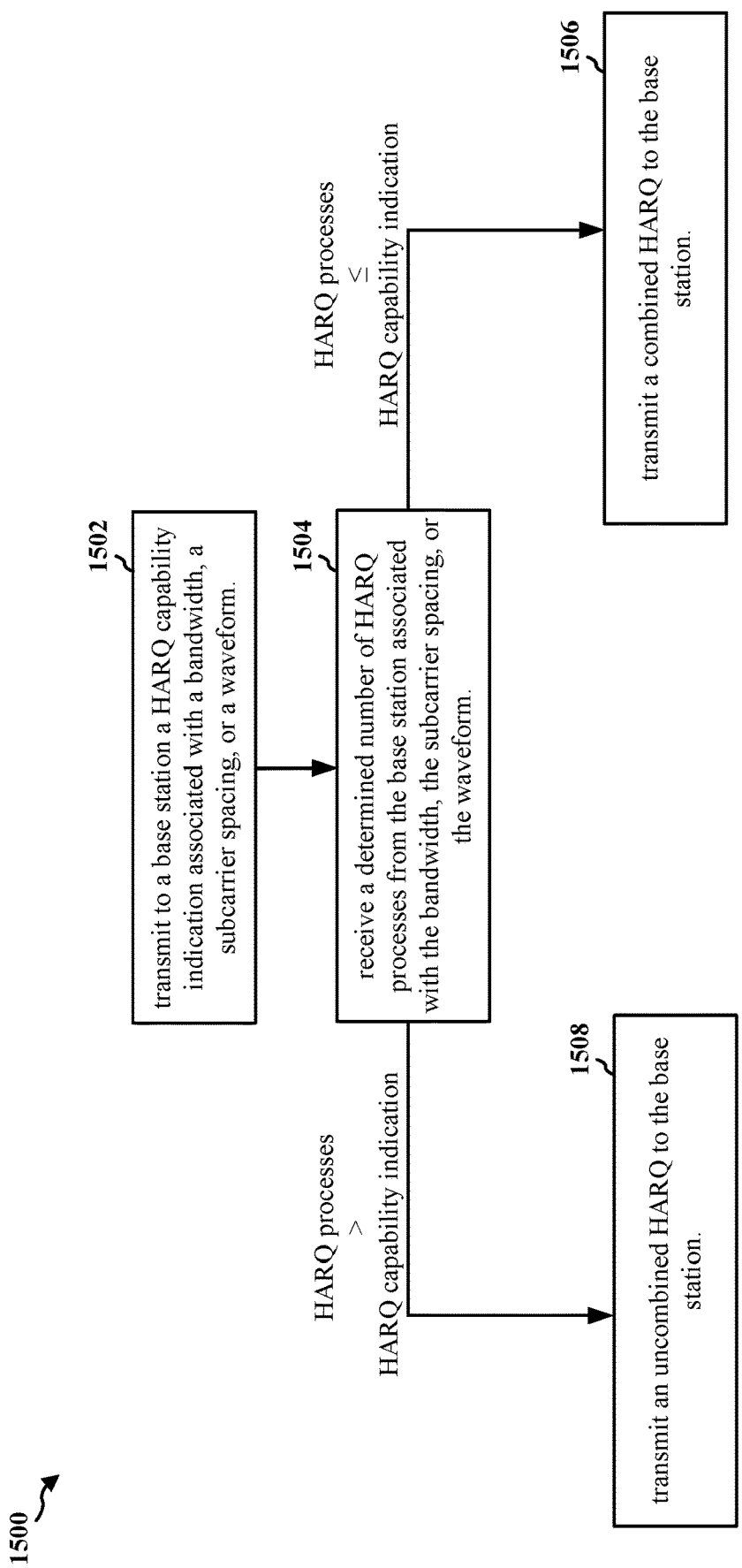
FIG. 15 is a flowchart of a method of wireless communication.

FIG. 15 is a flowchart 1500 of a method of wireless communication. The method may be performed by a UE or a component of a UE (e.g., the UE 104; the apparatus 1602; the cellular baseband processor 1604, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to receive scheduled communications with a base station having associated characteristics based on a HARQ capability indication.

At 1502, the UE may transmit a HARQ capability indication. For example, 1502 may be performed by HARQ capability component 1646 of apparatus 1602. The UE may transmit the HARQ capability indication to a base station. The HARQ capability indication may be associated with a bandwidth, a subcarrier spacing, or a waveform. In some aspects, the HARQ capability indication may be based on a size of a HARQ buffer of the UE.

At 1504, the UE may receive a number of HARQ processes associated with the bandwidth, the subcarrier spacing, or the waveform. For example, 1504 may be performed by HARQ process component 1648 of apparatus 1602. The UE may receive the number of HARQ processes from the base station.

At 1506, the UE may transmit a combined HARQ to the base station. For example, 1506 may be performed by combined HARQ component 1650 of apparatus 1602. The UE may transmit the combined HARQ to the base station if the determined number of HARQ processes is equal to or less than the HARQ capability indication.

At 1508, the UE may transmit an uncombined HARQ to the base station. For example, 1508 may be performed by uncombined HARQ component 1652 of apparatus 1602. The UE may transmit the uncombined HARQ to the base station if the determined number of HARQ processes is greater than the HARQ capability indication.

Figure 16:
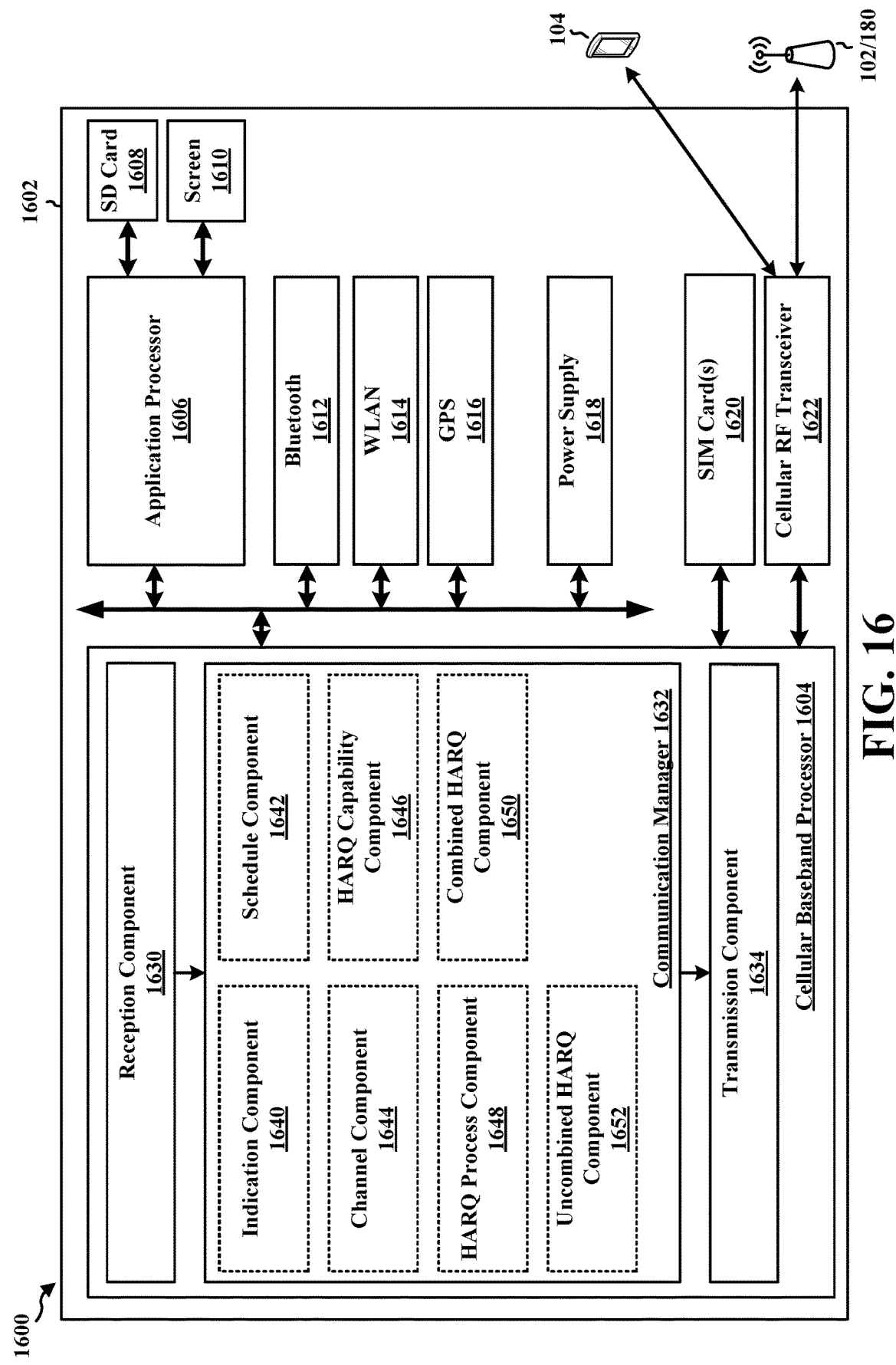
FIG. 16 is a diagram illustrating an example of a hardware implementation for an example apparatus.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the cellular baseband processor 1604, and in another configuration, the apparatus 1602 may be the entire UE (e.g., see 350 of FIG. 3) and include the aforediscussed additional modules of the apparatus 1602.

The communication manager 1632 includes an indication component 1640 that is configured to transmit a timing indication associated with a bandwidth, a subcarrier spacing, or a waveform, e.g., as described in connection with 1402 of FIG. 14. The communication manager 1632 further includes a schedule component 1642 that is configured to receive a scheduling grant, e.g., as described in connection with 1404 of FIG. 14. The schedule component 1642 may be configured to receive a periodic scheduling pattern from the base station, e.g., as described in connection with 1410 of FIG. 14. The communication manager 1632 further includes a channel component 1644 that is configured to receive from the base station or transmit to the base station a first data channel, e.g., as described in connection with 1406 of FIG. 14. The channel component 1644 may be configured to receive from the base station or transmit to the base station a second data channel at a second time, e.g., as described in connection with 1408 of FIG. 14. The communication manager 1632 further includes a HARQ capability component 1646 that is configured to transmit a HARQ capability indication, e.g., as described in connection with 1502 of FIG. 15. The communication manager 1632 further includes a HARQ process component 1648 that is configured to receive a number of HARQ processes associated with the bandwidth, the subcarrier spacing, or the waveform, e.g., as described in connection with 1504 of FIG. 15. The communication manager 1632 further includes combined HARQ component 1650 that is configured to transmit a combined HARQ to the base station, e.g., as described in connection with 1506 of FIG. 15. The communication manager 1632 further includes an uncombined HARQ component 1652 that is configured to transmit an uncombined HARQ to the base station, e.g., as described in connection with 1508 of FIG. 15.

The apparatus may include additional components that perform each of the blocks of the algorithm in the aforementioned flowcharts of FIGS. 14 and 15. As such, each block in the aforementioned flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for transmitting, to a base station, a timing indication associated with a bandwidth, a subcarrier spacing, or a waveform. The timing indication identifying a delay duration based on a processing timeline for the UE. The apparatus includes means for receiving from the base station, or transmitting to the base station, a first data channel having the bandwidth, the subcarrier spacing, or the waveform scheduled based on the timing indication. The first data channel is transmitted or received at a first time based on the timing indication. The apparatus further includes means for receiving a scheduling grant from the base station at a second time, the scheduling grant scheduling the first data channel to be transmitted or received at the first time. A time duration separating the first time and the second time that is equal to or greater than the delay duration. The apparatus further includes means for receiving a set of data channels from the base station. The apparatus further includes means for discarding data channels of the set of data channels received during the time duration. The apparatus further includes means for storing data channels of the set of data channels received after the time duration on a buffer of the UE. The apparatus further includes means for receiving from the base station, or transmitting to the base station, a second data channel at a second time. A time duration separating the first time and the second time that is equal to or greater than the delay duration. The apparatus further includes means for receiving a periodic scheduling pattern from the base station, the periodic scheduling pattern indicating a set of slots for the UE to transmit or receive data channels comprising the first data channel. The apparatus includes means for transmitting, to a base station, a HARQ capability indication associated with a bandwidth, a subcarrier spacing, or a waveform. The apparatus includes means for receiving, from the base station, a number of HARQ processes associated with the bandwidth, the subcarrier spacing, or the waveform. The apparatus includes means for transmitting a combined HARQ to the base station if the determined number of HARQ processes is equal to or less than the HARQ capability indication. The apparatus includes means for transmitting an uncombined HARQ to the base station if the determined number of HARQ processes is greater than the HARQ capability indication. The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a base station comprising receiving, from a UE, a timing indication associated with a bandwidth, a subcarrier spacing, or a waveform, the timing indication identifying a delay duration based on a processing timeline for the UE; and receiving from the UE, or transmitting to the UE, a first data channel having the bandwidth, the subcarrier spacing, or the waveform scheduled based on the timing indication, wherein the first data channel is transmitted or received at a first time based on the timing indication.

In Aspect 2, the method of Aspect 1 further includes that the delay duration is a number of slots.

In Aspect 3, the method of Aspect 1 or 2 further includes that the delay duration is based on a processing speed of the UE or a buffer size of the UE.

In Aspect 4, the method of any of Aspects 1-3 further includes transmitting a scheduling grant to the UE at a second time, the scheduling grant scheduling the first data channel to be transmitted or received at the first time, wherein a time duration separating the first time and the second time that is equal to or greater than the delay duration.

In Aspect 5, the method of any of Aspects 1-4 further includes receiving from the UE, or transmitting to the UE, a second data channel at a second time, wherein a time duration separating the first time and the second time that is equal to or greater than the delay duration.

In Aspect 6, the method of any of Aspects 1-5 further includes determining a set of slots based on the delay duration; and transmitting a periodic scheduling pattern to the UE, the periodic scheduling pattern indicating the set of slots for the UE to transmit or receive data channels comprising the first data channel.

Aspect 7 is a device including one or more processors and one or more memories in electronic communication with the one or more processors and storing instructions executable by the one or more processors to cause the device to implement a method as in any of Aspects 1-6.

Aspect 8 is a system or apparatus including means for implementing a method or realizing an apparatus as in any of Aspects 1-6.

Aspect 9 is a non-transitory computer readable storage medium storing instructions executable by one or more processors to cause the one or more processors to implement a method as in any of Aspect 1-6.

Aspect 10 is a method of wireless communication at a UE comprising transmitting, to a base station, a timing indication associated with a bandwidth, a subcarrier spacing, or a waveform, the timing indication identifying a delay duration based on a processing timeline for the UE; and receiving from the base station, or transmitting to the base station, a first data channel having the bandwidth, the subcarrier spacing, or the waveform scheduled based on the timing indication, wherein the first data channel is transmitted or received at a first time based on the timing indication.

In Aspect 11, the method of Aspect 10 further includes that the delay duration is a number of slots.

In Aspect 12, the method of Aspect 10 or 11 further includes that the delay duration is based on a processing speed of the UE or a buffer size of the UE.

In Aspect 13, the method of any of Aspects 10-12 further includes receiving a scheduling grant from the base station at a second time, the scheduling grant scheduling the first data channel to be transmitted or received at the first time, wherein a time duration separating the first time and the second time that is equal to or greater than the delay duration.

In Aspect 14, the method of any of Aspects 10-13 further includes receiving a set of data channels from the base station; discarding data channels of the set of data channels received during the time duration; and storing data channels of the set of data channels received after the time duration on a buffer of the UE.

In Aspect 15, the method of any of Aspects 10-14 further includes receiving from the base station, or transmitting to the base station, a second data channel at a second time, wherein a time duration separating the first time and the second time that is equal to or greater than the delay duration.

In Aspect 16, the method of any of Aspects 10-15 further includes receiving a periodic scheduling pattern from the base station, the periodic scheduling pattern indicating a set of slots for the UE to transmit or receive data channels comprising the first data channel.

Aspect 17 is a device including one or more processors and one or more memories in electronic communication with the one or more processors and storing instructions executable by the one or more processors to cause the device to implement a method as in any of Aspects 10-16.

Aspect 18 is a system or apparatus including means for implementing a method or realizing an apparatus as in any of Aspects 10-16.

Aspect 19 is a non-transitory computer readable storage medium storing instructions executable by one or more processors to cause the one or more processors to implement a method as in any of Aspect 10-16.

Aspect 20 is a method of wireless communication at a base station comprising receiving, from a UE, a HARQ capability indication associated with a bandwidth, a subcarrier spacing, or a waveform; determining a number of HARQ processes for the UE; transmitting the determined number of HARQ processes to the UE associated with the bandwidth, the subcarrier spacing, or the waveform; receiving a combined HARQ from the UE if the determined number of HARQ processes is equal to or less than the HARQ capability indication; and receiving an uncombined HARQ from the UE if the determined number of HARQ processes is greater than the HARQ capability indication.

In Aspect 21, the method of Aspect 20 further includes that the HARQ capability indication is based on a size of a HARQ buffer of the UE.

Aspect 22 is a device including one or more processors and one or more memories in electronic communication with the one or more processors and storing instructions executable by the one or more processors to cause the device to implement a method as in any of Aspects 20-21.

Aspect 23 is a system or apparatus including means for implementing a method or realizing an apparatus as in any of Aspects 20-21.

Aspect 24 is a non-transitory computer readable storage medium storing instructions executable by one or more processors to cause the one or more processors to implement a method as in any of Aspect 20-21.

Aspect 25 is a method of wireless communication at a UE comprising transmitting, to a base station, a hybrid automatic repeat request (HARQ) capability indication associated with a bandwidth, a subcarrier spacing, or a waveform; receiving, from the base station, a number of HARQ processes associated with the bandwidth, the subcarrier spacing, or the waveform; transmitting a combined HARQ to the base station if the determined number of HARQ processes is equal to or less than the HARQ capability indication; and transmitting an uncombined HARQ to the base station if the determined number of HARQ processes is greater than the HARQ capability indication.

In Aspect 26, the method of Aspect 25 further includes that the HARQ capability indication is based on a size of a HARQ buffer of the UE.

Aspect 27 is a device including one or more processors and one or more memories in electronic communication with the one or more processors and storing instructions executable by the one or more processors to cause the device to implement a method as in any of Aspects 25-26.

Aspect 28 is a system or apparatus including means for implementing a method or realizing an apparatus as in any of Aspects 25-26.

Aspect 29 is a non-transitory computer readable storage medium storing instructions executable by one or more processors to cause the one or more processors to implement a method as in any of Aspect 25-26.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
receiving, from a user equipment (UE), a timing indication comprising a plurality of capability indications for a corresponding plurality of sets of communication characteristics, wherein each capability indication of the plurality of capability indications indicates at least one delay duration based on a processing timeline for the UE to process communications for a corresponding set of communication characteristics from the corresponding plurality of sets of communication characteristics, wherein each set of communication characteristics in the corresponding plurality of sets of communication characteristics includes at least one of a subcarrier spacing or a waveform;
identifying, based on the timing indication, a first at least one delay duration for a first corresponding set of communication characteristics for communications with the UE;
transmitting, to the UE and based on the first at least one delay duration and the first corresponding set of communication characteristics, a first periodic scheduling pattern for downlink communications with the UE and a second periodic scheduling pattern for uplink communications with the UE, wherein the first periodic scheduling pattern has a first periodicity and the second periodic scheduling pattern has a second periodicity that is different from the first; and
receiving from the UE, or transmitting to the UE, a first data channel transmission having the first corresponding set of communication characteristics, wherein the first data channel transmission is transmitted or received at a first time based on one of the first periodic scheduling pattern or the second periodic scheduling pattern.

2. The method of claim 1, wherein each delay duration is indicated as a number of slots.

3. The method of claim 1, wherein each delay duration is based on one or more of a processing speed of the UE or a buffer size of the UE.

4. The method of claim 1, further comprising:
transmitting a scheduling grant to the UE at a second time prior to the first time, the scheduling grant scheduling the first data channel transmission to be transmitted or received at the first time, wherein a time duration separating the second time and the first time that is equal to or greater than the first at least one delay duration.

5. The method of claim 1, further comprising:
receiving from the UE, or transmitting to the UE, a second data channel transmission at a second time, wherein a time duration separating the first time and the second time that is equal to or greater than the first at least one delay duration.

6. The method of claim 1, wherein the at least one delay duration comprises a first delay duration associated with downlink communication and a second delay duration associated with uplink communication, the method further comprising:
determining a first set of active slots in the first periodic scheduling pattern based on the first delay duration; and
determining a second set of active slots in the second periodic scheduling pattern based on the second delay duration.

7. A method of wireless communication at a user equipment (UE), comprising:
transmitting, to a base station, a timing indication comprising a plurality of capability indications for a corresponding plurality of sets of communication characteristics, wherein each capability indication of the plurality of capability indications indicates at least one delay duration based on a processing timeline for the UE to process communications for a corresponding set of communication characteristics from the corresponding plurality of sets of communication characteristics, wherein each set of communication characteristics in the corresponding plurality of sets of communication characteristics includes at least one of a subcarrier spacing or a waveform;
identifying, based on the timing indication, a first at least one delay duration for a first corresponding set of communication characteristics for communications with the UE;
receiving, based on the first at least one delay duration and the first corresponding set of communication characteristics, a first periodic scheduling pattern for downlink communications with the base station and a second periodic scheduling pattern for uplink communications with the base station, wherein the first periodic scheduling pattern has a first periodicity and the second periodic scheduling pattern has a second periodicity that is different from the first periodicity; and
receiving from the base station, or transmitting to the base station, a first data channel transmission having the first corresponding set of communication characteristics, wherein the first data channel transmission is transmitted or received at a first time based on one of the first periodic scheduling pattern or the second periodic scheduling pattern.

8. The method of claim 7, wherein each delay duration is indicated as a number of slots.

9. The method of claim 7, wherein each delay duration is based on one or more of a processing speed of the UE or a buffer size of the UE.

10. The method of claim 7, further comprising:
receiving a scheduling grant from the base station at a second time prior to the first time, the scheduling grant scheduling the first data channel transmission to be transmitted or received at the first time, wherein a time duration separating the second time and the first time that is equal to or greater than the first at least one delay duration.

11. The method of claim 10, further comprising:
receiving a set of data channel transmissions from the base station;
discarding one or more data channel transmissions of the set of data channel transmissions received during the time duration; and
storing at least one data channel of the set of data channel transmissions received after the time duration on a buffer of the UE.

12. The method of claim 7, further comprising:
receiving from the base station, or transmitting to the base station, a second data channel transmission at a second time, wherein a time duration separating the first time and the second time that is equal to or greater than the first at least one delay duration.

13. An apparatus for wireless communication at a user equipment (UE) comprising:
memory; and
at least one processor coupled to the memory and configured to:
transmit, to a base station, a timing indication comprising a plurality of capability indications for a corresponding plurality of sets of communication characteristics, wherein each capability indication of the plurality of capability indications indicates at least one delay duration based on a processing timeline for the UE to process communications for a corresponding set of communication characteristics from the corresponding plurality of sets of communication characteristics, wherein each set of communication characteristics in the corresponding plurality of sets of communication characteristics includes at least one of a subcarrier spacing or a waveform;
identify, based on the timing indication, a first at least one delay duration for a first corresponding set of communication characteristics for communications with the UE;
receive, based on the first at least one delay duration and the first corresponding set of communication characteristics, a first periodic scheduling pattern for downlink communications with the base station and a second periodic scheduling pattern for uplink communications with the base station, wherein the first periodic scheduling pattern has a first periodicity and the second periodic scheduling pattern has a second periodicity that is different from the first periodicity; and
receive from the base station, or transmit to the base station, a first data channel transmission having the first corresponding set of communication characteristics, wherein the first data channel transmission is transmitted or received at a first time based on one of the first periodic scheduling pattern or the second periodic scheduling pattern.

14. The apparatus of claim 13, wherein each delay duration is indicated as a number of slots.

15. The apparatus of claim 13, wherein each delay duration is based on one or more of a processing speed of the UE or a buffer size of the UE.

16. The apparatus of claim 13, wherein the at least one processor is further configured to:
receive a scheduling grant from the base station at a second time prior to the first time, the scheduling grant scheduling the first data channel transmission to be transmitted or received at the first time, wherein a time duration separating the second time and the first time that is equal to or greater than the first at least one delay duration.

17. The apparatus of claim 16, wherein the at least one processor is further configured to:
receive a set of data channel transmissions from the base station;
discard one or more data channel transmissions of the set of data channel transmissions received during the time duration; and
store at least one data channel transmission of the set of data channel transmissions received after the time duration on a buffer of the UE.

18. The apparatus of claim 13, wherein the at least one processor is further configured to:
receive from the base station, or transmit to the base station, a second data channel transmission at a second time, wherein a time duration separating the first time and the second time that is equal to or greater than the first at least one delay duration.

\* \* \* \* \*